(12) United States Patent  (10) Patent No.: US 8,882,268 B2
Calixte et al.  (45) Date of Patent: Nov. 11, 2014

(54) OPTICAL FUNCTION DETERMINING METHOD

(75) Inventors: Laurent Calixte, Charenton le Pont (FR); Cyril Guilloux, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 44 days.

(21) Appl. No.: 13/500,810

(22) PCT Filed: Oct. 7, 2010

(86) PCT No.: PCT/EP2010/065025
§ 371 (c)(1),
(2), (4) Date: Apr. 6, 2012

(87) PCT Pub. No.: WO2011/042504
PCT Pub. Date: Apr. 14, 2011

(65) Prior Publication Data
US 2012/0212705 A1  Aug. 23, 2012

(30) Foreign Application Priority Data
Oct. 7, 2009 (EP) .................................... 09305949

(51) Int. Cl.
*G02C 7/02* (2006.01)
*G02C 7/06* (2006.01)
(52) U.S. Cl.
CPC .................................... *G02C 7/061* (2013.01); *G02C 7/027* (2013.01)
USPC .................................................... 351/159.77
(58) Field of Classification Search
CPC .......... G02C 7/02; G02C 7/027; G02C 7/028; G02C 7/022; G02C 7/024; G02C 7/025
USPC .................. 351/159.42, 159.73–159.77, 246, 351/159.41
See application file for complete search history.

(56) References Cited

U.S. PATENT DOCUMENTS 6,318,859 B1 * 11/2001 Baudart et al. ........... 351/159.42
6,364,481 B1  4/2002 O'Connor et al.
(Continued)

FOREIGN PATENT DOCUMENTS

EP  2177943 A1 *  4/2010 ............... G02C 7/02

OTHER PUBLICATIONS

Barten, Peter G. J., "Contrast sensitivity of the human eye and its effect on image quality," HV Press, Knegsel, 212 pgs., 1999.
Fauquier, C. et al., "Influence of combined power error and astigmatism on visual acuity," Vision Science and Its Applications, OSA Technical Digest Series, 4 pgs., 1995.
(Continued)

*Primary Examiner* — Darryl J Collins
*Assistant Examiner* — Gary O'Neill
(74) *Attorney, Agent, or Firm* — Seed IP Law Group PLLC

(57) ABSTRACT

A method implemented by computer means for determining a virtual wearer-ophthalmic lens-ergorama system associated with an optical function of an ophthalmic lens for a given wearer, comprising: a prescription data providing step, an optical reference surface data providing step, a virtual wearer-ophthalmic lens-ergorama system determining step, a criteria selecting step, a target value defining step, an evaluation step, and a modification step, in which at least one parameter of the virtual wearer-ophthalmic lens-ergorama system different from the base curve of the ophthalmic lens is modified, in order to minimize the difference between the target value and the evaluation criterion value.

14 Claims, 26 Drawing Sheets

(56) References Cited

U.S. PATENT DOCUMENTS

| | | |
|---|---|---|
| 6,382,789 B1 | 5/2002 | Baudart et al. |
| 2005/0083482 A1 | 4/2005 | Miller et al. |
| 2007/0182923 A1 | 8/2007 | Kitani et al. |
| 2007/0242218 A1 | 10/2007 | Berthezene et al. |
| 2008/0013038 A1* | 1/2008 | Guilloux .................. 351/47 |
| 2009/0290121 A1 | 11/2009 | Drobe et al. |

OTHER PUBLICATIONS

Malacara and Malacara, "Handbook of Optical Design," CRC Press, pp. 294-303, Sep. 21, 2003.

Thibos, L. N. et al., "Accuracy and precision of objective refraction from wavefront aberrations," Journal of Vision, vol. 4, pp. 329-351, 2004.

* cited by examiner

OPTICAL FUNCTION DETERMINING METHOD

The invention relates to a method implemented by computer means for determining a virtual wearer-ophthalmic lens-ergorama system associated with an optical function of an ophthalmic lens for a given wearer. The invention further relates to calculating and manufacturing methods of an ophthalmic lens having an optical function associated with a virtual wearer-ophthalmic lens-ergorama system.

According to a common practice, to obtain a pair of ophthalmic lens corresponding to a wearer prescription, semi-finished ophthalmic lens blanks are provided by a lens manufacturer to the prescription labs. Generally, a semi-finished ophthalmic lens blank comprises a first surface corresponding to an optical reference surface, for example a progressive surface in the case of progressive addition lenses, and a second spherical surface. A standard semi-finished lens blank having suitable optical characteristics, is selected based on the wearer prescription. The back spherical surface is finally machined and polished by the prescription lab so as to obtain a sphero-torical surface complying with the prescription. An ophthalmic optical lens complying with the prescription is thus obtained.

To improve the optical characteristics of the ophthalmic lens, optimisation methods of the parameters of the ophthalmic lens are used. Such optimisation methods are designed so as to have the optical function of the ophthalmic lens as close as possible to a predetermined target optical function. The target optical function represents the optical characteristic the ophthalmic lens should have.

In some cases although the ophthalmic lens is optimized, the optical function of the optimized ophthalmic lens may not reach the target optical function. In some case, the optical function of the optimized ophthalmic lens may have optical characteristic worst than if the ophthalmic lens had not been optimized.

The present invention aims to improve the situation.

To this end, it proposes a method performed by computer means for determining a virtual wearer-ophthalmic lens-ergorama system associated with an optical function of an ophthalmic lens for a given wearer, comprising:
- a prescription data providing step, in which prescription data representing the prescription of the wearer are provided,
- an optical reference surface data providing step, in which surface data representing a optical reference surface corresponding to the prescription of the wearer are provided,
- a virtual wearer-ophthalmic lens-ergorama system determining step, in which a virtual wearer-ophthalmic lens-ergorama system is determined using the prescription and surface data,
- a criteria selecting step, in which at least one criterion of the optical function associated with the virtual wearer-ophthalmic lens-ergorama system is selected,
- a target value defining step in which for the at least one selected criterion a target value associated to said criteria is defined,
- an evaluation step, in which the evaluated value of the at least one selected criterion of the optical function associated with the virtual wearer-ophthalmic lens-ergorama system is evaluated,
- a modification step, in which at least one parameter of the virtual wearer-ophthalmic lens-ergorama system different from the base curve of the ophthalmic lens is modified, in order to minimize the difference between the target value and the evaluation criterion value, wherein during the modification step, the surface data representing the optical reference surface corresponding to the prescription of the wearer are unchanged.

Advantageously, the method according to the invention provides a virtual wearer-ophthalmic lens-ergorama system and therefore an optical function associated with such system that may be determined according to preselected criteria.

Advantageously, the optical function associated with the determined virtual wearer-ophthalmic lens-ergorama system has a lower level of optical aberration than the optical function of the prior art.

Furthermore, the use in the method of the invention of an optical reference surface allows assuring that it is possible to design an optical lens presenting the optical function associated with the determined virtual wearer-ophthalmic lens-ergorama system.

Advantageously, the virtual wearer-ophthalmic lens-ergorama system and therefore the optical function associated with such system may be optimized so as to ensure that it is possible to determine an ophthalmic lens that presents such optical function, or at least that when optimizing the parameters of the ophthalmic lens so as to have it's optical function correspond to the desired optical function the optical characteristics of the ophthalmic lens are improved.

According to further embodiments of the invention, the method according to the invention may comprise the following features alone or in combination:
- the at least one optical criterion is selected among one or several of the three following criteria groups consisting of:
  - central vision criteria (CVOC) group consisting of: power in central vision, astigmatism in central vision, higher-order aberration in central vision, acuity in central vision, contrast in central vision, prismatic deviation in central vision, ocular deviation, object visual field in central vision, image visual field in central vision, magnification in central vision and a variation of preceding criteria;
  - peripheral vision criteria (PVOC) group consisting of: power in peripheral vision, astigmatism in peripheral vision, higher-order aberration in peripheral vision, pupil field ray deviation, object visual field in peripheral vision, image visual field in peripheral vision, prismatic deviation in peripheral vision, magnification in peripheral vision, and a variation of preceding criteria;
  - global optical criteria (GOC) group consisting of: magnification of the eyes and temple shift;
  and wherein during the target value defining step for each selected criterion is defined:
  - an evaluation zone comprising one or several evaluation domains and a set of target values associated to said evaluation domains, if said criterion belongs to the central or to the peripheral vision criteria groups, or
  - a target value associated to said criterion, if said criterion belongs to the global criteria group;
  and during the evaluation step, if the selected criterion belongs to the central or peripheral vision criteria groups, a set of criterion values associated to said evaluation domains is evaluated,
  during the modification step the at least one parameter of the virtual wearer-ophthalmic lens-ergorama system is modified in order to minimize a cost function considering the target value by repeating the evaluation step until a stop criterion is satisfied, the cost function is a sum over the selected criteria of:
sums, over the evaluation domains, of differences between a criterion value associated to an evaluation domain and the target value associated to said evaluation domain to the power of two, for criteria belonging to the central vision and peripheral vision criteria groups, and differences between a criterion value and a target value to the power of two, for criteria belonging to the global optical criteria group, the cost function J is mathematically expressed according to:

$$J(v) = \sum_{k=1}^{N1} \sum_{i=1}^{Mk} w_k^i * (H_k(D_k^i, v) - T_k^i)^2 + \sum_{k=1}^{N2} w'_k * (H'_k(v) - T'_k)^2,$$

wherein:
k and i are integer variables,
$N_1$ is an integer superior or equal to 1 and represents the number of selected criteria belonging to the central vision and peripheral vision criteria groups;
$N_2$ is an integer superior or equal to 1 and represents the number of selected criteria belonging to the global optical criteria group;
$M_k$ is an integer superior or equal to 1 and represents the number of evaluation domains for a criterion belonging to the central vision or peripheral vision criteria groups of index k;
v is defining the virtual wearer-ophthalmic lens-ergorama system parameters;
$w^i_k$ are the weights associated to a criterion belonging to the central vision or peripheral vision criteria groups of index k and to an evaluation domain of index i;
$w'_k$ is the weight associated to a criterion belonging to the global optical criteria group of index k
$D^i_k$ is an evaluation domain of index i of an evaluation zone associated to a criterion belonging to the central vision or peripheral vision criteria groups of index k;
$H_k$ associates a criterion value to a criterion belonging to the central vision or peripheral vision criteria groups of index k an evaluation domain $D^i_k$ and the virtual wearer-ophthalmic lens-ergorama system defined by its parameters v;
$H'_k$ associates a criterion value to a criterion belonging to the global optical criteria group of index k and the virtual wearer-ophthalmic lens-ergorama system defined by its parameters v;
$T^i_k$ is a target value of index i of the set of target values associated to an evaluation domain $D^i_k$, of a criterion belonging to the central vision or peripheral vision criteria groups of index k;
$T'_k$ is the target value associated to a criterion belonging to the global optical criteria group of index k,
the at least one parameter of the virtual wearer-ophthalmic lens-ergorama system is selected among one or several of the four following parameters groups consisting of:
eyes parameter group consisting of: the diameter of the pupil, the position of the pupil, the position of the center of rotation of the eye, the position of the different diopter of the eye, for example the retina, the curvature of the different diopter of the eye, for example the retina, the index of the different environment of the eye;
ophthalmic lens parameter group consisting of: the tightness at a given point of the ophthalmic lens, the prism of the ophthalmic lens, the index of the substrate;
wearing parameter group consisting of: the vertex distance, pantoscopic angle, the wrap angle; and
object space parameter group consisting of the repartition of distance as a function of the gaze direction of each eye and/or the size of the objects,
the ophthalmic lens is a progressive ophthalmic lens,
the ophthalmic lens parameter group further comprises the addition of the different surfaces of the progressive ophthalmic lens,
a selected criterion belongs to the central vision criteria group and wherein the associated evaluation domains comprise at least one gaze direction, said direction being considered with regard to reference axes associated with the eye rotation center and used to perform ray tracing from the eye rotation center for the criterion evaluation,
a selected criterion belongs to the peripheral vision criteria group and the associated evaluation domains comprise at least one peripheral ray direction, said direction being considered with regard to reference axes associated with the entrance pupil center moving along a determined gaze direction and used to perform ray tracing from the entrance pupil center for the criterion evaluation.

The invention also relates to a method of calculating an ophthalmic lens, the ophthalmic lens being identified by a optical function, at least two optical surfaces comprise a first optical surface defined by a first equation and a second surface defined by a second equation, the method further comprises:
an optical function determining step, in which the optical function is determined from a virtual wearer-ophthalmic lens-ergorama system determined according to the invention,
a calculation step, in which the second equation is calculated from the optical function, and the first equation.

The invention further relates to a method of manufacturing an ophthalmic lens, the ophthalmic lens being associated with an optical function, the ophthalmic lens comprising a first surface defined by a first equation and a second surface defined by a second equation, the method comprising:
the calculation step according to the invention, in which the second equation is calculated from the optical function, and the first equation;
a semi-finished ophthalmic lens providing step, in Wh1ch a semi-finished ophthalmic lens comprising the first surface is provided; and
a machining step, in which the semi-finished ophthalmic lens is machined so as to be further provided with a second surface defined by the second equation and to obtain the ophthalmic lens.

The invention also relates to a computer program product comprising one or more stored sequence of instruction that is accessible to a processor and which, when executed by the processor, causes the processor to carry out the steps of the methods according to the invention, and to a computer-readable medium carrying one or more sequences of instructions of the computer program product according to the invention.

Unless specifically stated otherwise, as apparent from the following discussions, it is appreciated that throughout the specification discussions utilizing terms such as "computing", "calculating" "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

In the sense of the invention, "optimizing" shall preferably be understood as "minimizing" a real function. Of course, the person skilled in the art will understand that the invention is not limited to a minimization per se. The optimization could also be a maximisation of a real function. Namely "maximizing" a real function is equivalent to "minimizing" its opposite.

In the scope of the present invention, the aforementioned terms are understood according to the following definitions:

an "optical system" (OS) is defined by all its surfaces, mainly by the coefficients of the equations of said surfaces, the refractive index of the glasses and the position of each surface relatively to each other (offset, rotation and tilt). These elements are referred to the optical system parameters (OSP) of the optical system (OS). Surfaces of an optical system are usually represented according to a polynomial or parametric equation obtained by using a model based on the B-splines or Zernike polynomials. These models give continuous curvature on the whole lens. Surfaces can also be Fresnel or pixelized surfaces. A surface can be a function of several surfaces (for example, the function can be a weighted sum). The refractive index of materials can be inhomogeneous and may depend on some parameters of the optical system (OS);

an "optical criterion" is defined as a criterion that has an impact on the visual performance of a wearer and/or of an observer of the wearer. Optical criteria are classified into three groups:

central vision optical criteria (CVOC) group comprising: power in central vision, astigmatism in central vision, higher-order aberration in central vision, acuity in central vision, contrast in central vision, prismatic deviation in central vision, ocular deviation, object visual field in central vision, image visual field in central vision, magnification in central vision or a variation of preceding criteria;

peripheral vision optical criteria (PVOC) group comprising: power in peripheral vision, astigmatism in peripheral vision, higher-order aberration in peripheral vision, pupil field ray deviation, object visual field in peripheral vision, image visual field in peripheral vision, prismatic deviation in peripheral vision, magnification in peripheral vision, or a variation of preceding criteria;

global optical criteria (GOC) group comprising: magnification of the eye, temple shift.

According to the present invention, a "local criterion" shall mean that the criterion is evaluated on an evaluation domain defined with at least a gaze direction or peripheral ray direction. In particular, the above mentioned central vision optical criteria (CVOC) and peripheral vision optical criteria (PVOC) are local criteria.

According to the present invention, a "global criterion" shall mean that the global criterion is evaluated taking into account the optical system (OS) as a whole.

In the scope of the present invention, the other aforementioned terms are understood according to the following definitions:

"central vision" (also referred as "foveal vision") describes the work of the fovea, a small area in the center of the retina that contains a rich collection of cones. In a central vision situation, an observer looks at an object which stays in a gaze direction and the fovea of the observer is moved to follow the object. Central vision permits a person to read, drive, and perform other activities that require fine and sharp vision;

a "gaze direction" is defined by two angles measured with regard to reference axes centered on the center of rotation of the eye;

an "ergorama" is a function linking the usual distance of object points with each gaze direction;

"peripheral vision" describes the ability to see objects and movement outside of the direct line of vision. In a peripheral vision situation, an observer looks in a fixed gaze direction and an object is seen out of this direct line of vision. The direction of a ray coming from the object to the eye is then different from the gaze direction and is referred as peripheral ray direction. Peripheral vision is mainly the work of the rods, photoreceptor cells located outside the fovea of the retina;

a "peripheral ray direction" is defined by two angles measured with regard to reference axes centered on the eye entrance pupil and moving along the gaze direction axis;

a "the meridian line" is constituted by the intersection of the front side (object side) surface of the lens and an average wearer's glance when looking straight ahead at objects located in a meridian plane, at different distances; in this case, the meridian is obtained from a definitions of the average wearer's posture-point of rotation of the eye, position of the frame, angle the frame makes with the vertical, near vision distance, etc.; these various parameters allow the meridian to be drawn on the surface of the lens. French patent application 2,753,805 is an example of a method of this type in which a meridian is obtained by ray tracing, taking account of the closeness of the reading plane as well as prismatic effects;

"power in central vision" means that the power prescribed to the wearer is taken into account. The parameters of the optical system associated with the optical function are calculated in order to minimize power errors for each gaze direction;

"astigmatism in central vision" means that the parameters of the optical system associated to the optical function are calculated in order to minimize the difference between astigmatism prescribed to the wearer and astigmatism generated by the intermediate optical system both as regards amplitude and the axis thereof in the reference axes associated to the center of rotation of the eye (CRE) and for each gaze direction, this difference being called residual astigmatism;

"higher-order aberrations in central vision" describe aberrations that modify the blurredness of the image of the object observed by the wearer in central vision besides the commonly residual power and residual astigmatism, for example, spherical aberration and coma. The orders by which aberrations are referred to are generally orders expressed by Zernike polynomial representation;

Higher-order aberrations of an optical system may be characterised by the following parameters: "higher-order aberrations RMS (Root Mean Square) value", "Strehl Ratio", "Pupil Ratio", the "Modulation Transfer function volume".

"Higher-order aberrations Root Mean Square" is usually written as HOA RMS; its unit is usually micrometer (μm).

In absence of aberrations, the intensity is a maximum at a Gaussian image point. "Strehl Ratio" is used to characterize aberrations: it is the ratio of the intensity at the Gaussian image point (the origin of the reference sphere is the point of maximum intensity in the observation plane) in the presence of higher-order aberrations, divided by the intensity that would be obtained if no aberration were present.

MTF is the function that represents the amplitude of the modulation (or the contrast of a sinusoidal periodic structure) in the image obtained from the object by the optical system for each spatial frequency (see for example: Handbook of lens design, Malacara D. & Malacara Z. pages 295 to 303, 1994 Marcel Dekker Inc.). It is possible to calculate the volume of the MTF by integrating this function over a spatial frequency range that is typically between 0 and infinity. Many other typical parameters are describe in "Accuracy and precision of objective refraction from wavefront aberrations", Larry N. Thibos, Xin Hong, Arthur Bradley, Raymond A. Applegate, Journal of Vision (2004) 4, see pages 329 to 351."

It has to be noticed that the lower is the higher-order aberration level, the lower is the HOA RMS value but the higher is the Strehl Ratio (maximum value: 1) and the higher is the MTF volume.

"visual acuity in central vision" is acuteness or clearness of vision. It is a quantitative measure of the ability to identify black symbols on a white background at a standardized distance when the size of the symbols is varied. The visual acuity represents the smallest size that can be reliably identified and is the most common clinical measurement of visual function. The visual acuity can be estimated from models taking into account central vision criteria, as power error or astigmatism such as disclosed in FAUQUIER C., BONNIN T., MIEGE C., ROLAND E.: Influence of Combined Power Error and Astigmatism on Visual Acuity, Vision Science and its applications (VSIA), Santa Fe N. Mex. (USA), 2-7 fév. 1995.

"contrast (sensitivity) in central vision" is the visual ability to detect luminance contrast, that is to say the ability to discern between luminances of different levels in a static image. The measurement of the contrast sensitivity of the eye is a more complete assessment of vision than standard visual acuity measurement. It provides an evaluation of the detection of objects (usually sinusoidal gratings) of varying spatial frequencies and of variable contrast and thus obtaining a contrast sensitivity function (CSF). The contrast sensitivity could also be estimated according to models such as disclosed in Peter G. J, Barten. "Contrast Sensitivity of the HUMAN EYE and Its Effects on Image Quality". Knegsel, 1999.

"power in peripheral vision" is defined as the power generated by the optical system by an object situated in peripheral vision;

"astigmatism in peripheral vision" is defined as the astigmatism generated by the optical system both as regards amplitude and the axis by an object situated in peripheral vision;

"ocular deviation" is defined in central vision and describes the fact that adding a lens causes an eye to rotate in order to stay focused on the same object. The angle can be measured in prismatic dioptres or degrees;

"object visual field in central vision" is defined in the object space by the portion of space that the eye can observe scanning an angular portion of the lens determined by at least two gaze directions. For instance, these gaze directions can be defined by the shape of the spectacle frame or by an aberration level that hinders visualizing the object space with a good enough sharpness;

"image visual field in central vision" is defined for a determined and fixed object visual field in central vision in the image space (eye space), as the angular portion scanned by the eye to visualize the visual field in the object space;

"higher-order aberrations in peripheral vision" describe aberrations that modify the blurredness of the image of the object observed by the wearer in peripheral vision besides the commonly residual peripheral power and residual peripheral astigmatism, for example, peripheral spherical aberration and peripheral coma. The orders by which aberrations are referred to are generally orders expressed by Zernike polynomial representation;

"pupil field ray deviation" describes that a ray coming from an object located in the peripheral field of view is modified by adding a lens on its path to the eye entrance pupil;

"object visual field in peripheral vision" is defined in the object space. It is the portion of space that the eye can observe in the peripheral visual field of view (while the eye is looking in a fixed direction) defined by at least two rays issued from the center of eye entrance pupil. For instance, these rays can be defined by the shape of the spectacle frame or by an aberration level that hinders visualizing the object space with a good enough sharpness;

"image visual field in peripheral vision" is defined for a determined and fixed peripheral object visual field as the corresponding angular portion in the image space viewed by the peripheral vision of the eye;

"prismatic deviation in central vision" is defined in the object space by the angular deviation of a ray issued from the center of rotation of the eye introduced by the quantity of prism of the lens;

"prismatic deviation in peripheral vision" is the angular deviation of a ray issued from the center of the entrance pupil introduced by the quantity of prism of the lens;

"magnification in central/peripheral vision" is defined as the ratio between the apparent angular size (or the solid angle) of an object seen in central/peripheral vision without lens and the apparent angular size (or the solid angle) of an object seen through the lens in central/peripheral vision;

"magnification of the eye" is defined as the magnification of the eye of the wearer assessed by an observer;

"temple shift" is defined as the offset of the wearer temple assessed by an observer;

an "evaluation zone" is associated with a local criterion to be evaluated; it is composed of one or several evaluation domains. An evaluation domain is composed of one or several gaze directions for a criterion belonging to the central vision optical criteria (CVOC) group or to the geometrical local criteria group and of one or several peripheral ray directions for a criterion belonging to the peripheral vision optical criteria group (PVOC);

a "target value" is a value to be reached by a criterion. When the selected criterion is a local criterion, a target value is associated to an evaluation domain. When the selected criterion is a global criterion, a target value is associated to the whole optical system (OS);

a "stop criterion" is used to find the iteration to stop the optimization algorithm; it is said that the system has reached an "equilibrium";

a "cost function" is a real function which is used for the calculation of a global cost function (GCF);

a "global cost function" (GCF) is defined as a function of at least one cost function and provides a level of performance of the intermediate optical system (IOS);

a "discipline" is set of criteria for which the same vector of variable parameters is defined;

an "equilibrium" is a state in which the system considered cannot be further optimized in a certain way. Examples of equilibrium are Nash equilibrium and Stackelberg equilibrium;

a variation of a central vision criterion evaluated thanks to an evaluation function in a particular gaze direction ($\alpha_1$, $\beta_1$) according to a component of the gaze direction is understood as the derivative of the said evaluation function of the said criterion with respect to the said component. Considering a evaluation function $H_k$, one can consider the partial derivative of $H_k$ with respect to $\alpha$:

$$\frac{\partial H_k}{\partial \alpha}(\alpha_1, \beta_1).$$

One can consider the partial derivative of $H_k$ with respect to $\beta$:

$$\frac{\partial H_k}{\partial \beta}(\alpha_1, \beta_1).$$

Variation of a criteria can be evaluated as the composition of the partial derivatives of the evaluation function with respect to $\alpha$ and to $\beta$, as for example:

$$\frac{\partial H_k}{\partial \alpha}(\alpha_1, \beta_1),$$

or $$\frac{\partial H_k}{\partial \beta}(\alpha_1, \beta_1),$$

or $$\sqrt{\left(\frac{\partial H_k}{\partial \alpha}(\alpha_1, \beta_1)\right)^2 + \left(\frac{\partial H_k}{\partial \beta}(\alpha_1, \beta_1)\right)^2} ;$$

a variation of a peripheral vision criterion evaluated thanks to an evaluation function in a particular ray direction ($\alpha'_1$, $\beta'_1$) according to a component of the ray direction is understood as the derivative of the said evaluation function of the said criterion with respect to the said component. Considering a evaluation function $H_k$, one can consider the partial derivative of $H_k$ with respect to $\alpha'$:

$$\frac{\partial H_k}{\partial \alpha'}(\alpha'_1, \beta'_1).$$

One can consider the partial derivative of $H_k$ with respect to $\beta'$:

$$\frac{\partial H_k}{\partial \beta'}(\alpha'_1, \beta'_1).$$

Variation of a criteria can be evaluated as the composition of the partial derivatives of the evaluation function with respect to $\alpha'$ and to $\beta'$, as for example:

$$\frac{\partial H_k}{\partial \alpha'}(\alpha'_1, \beta'_1),$$

or $$\frac{\partial H_k}{\partial \beta'}(\alpha'_1, \beta'_1),$$

or $$\sqrt{\left(\frac{\partial H_k}{\partial \alpha'}(\alpha'_1, \beta'_1)\right)^2 + \left(\frac{\partial H_k}{\partial \beta'}(\alpha'_1, \beta'_1)\right)^2} .$$

Non limiting embodiments of the invention will now be described with reference to the following drawings, wherein.

Figure 16A:
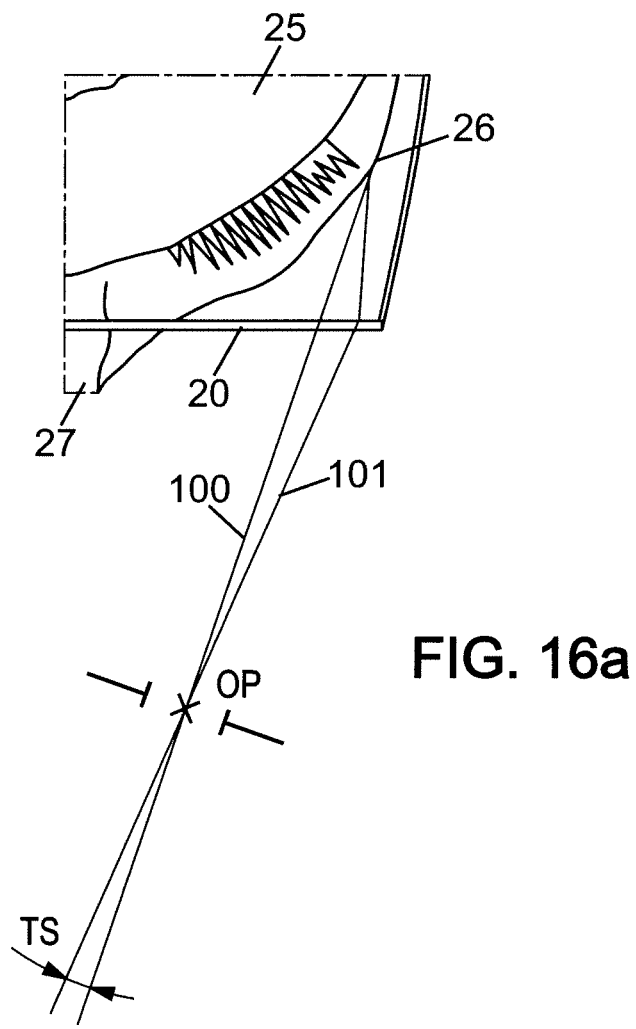
Figure 16B:
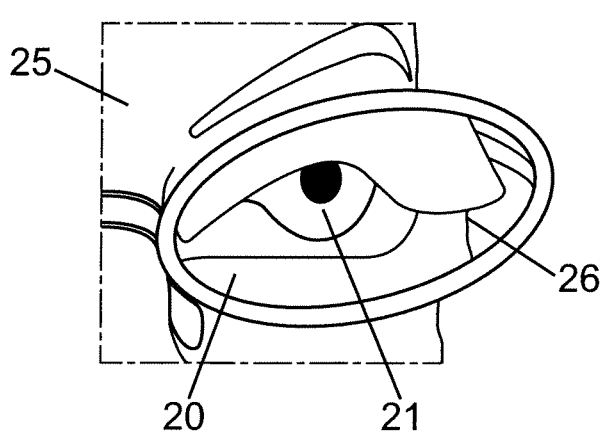

FIGS. 16a and b illustrate temple shift.

Figure 17A:
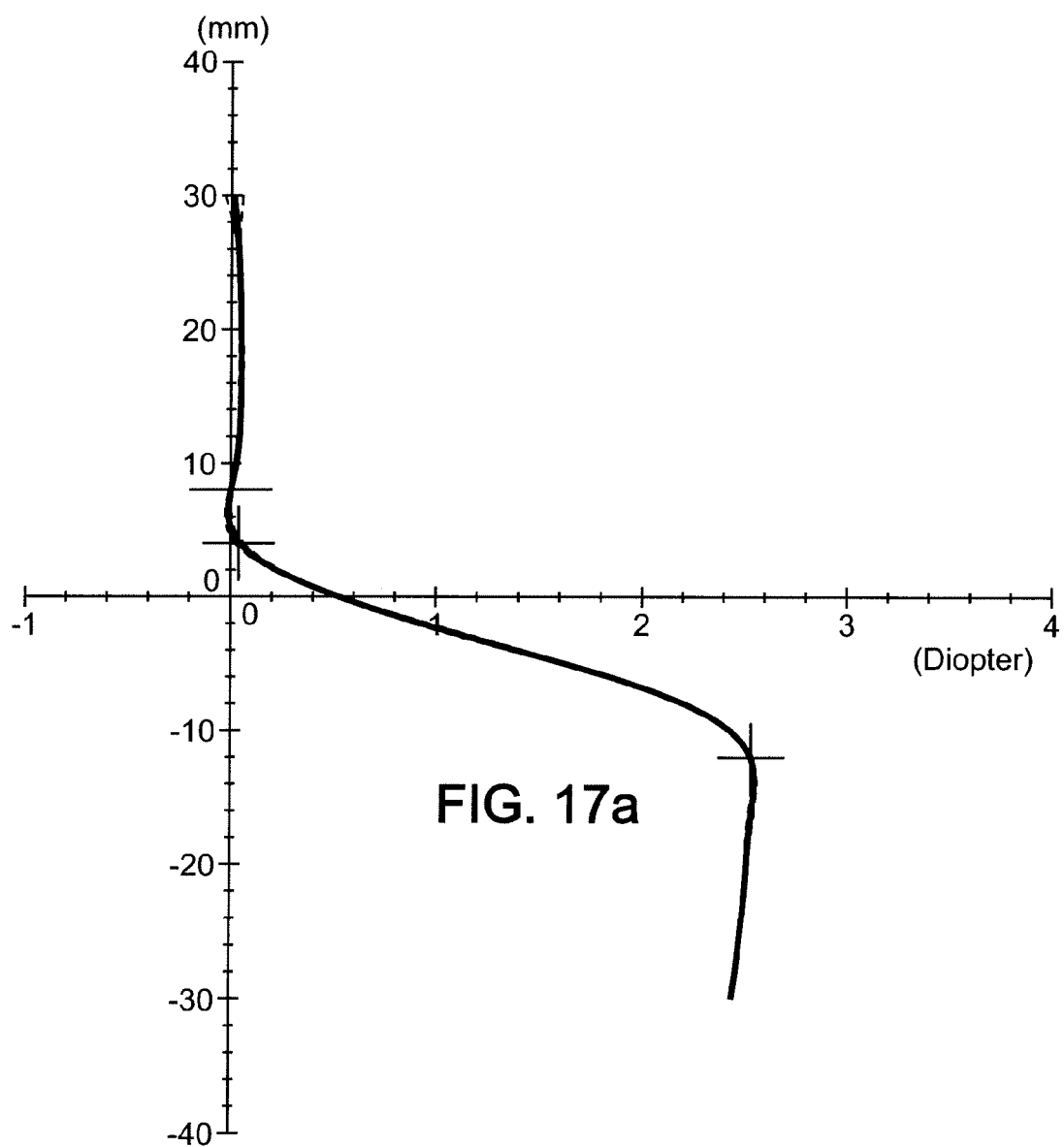
Figure 17B:
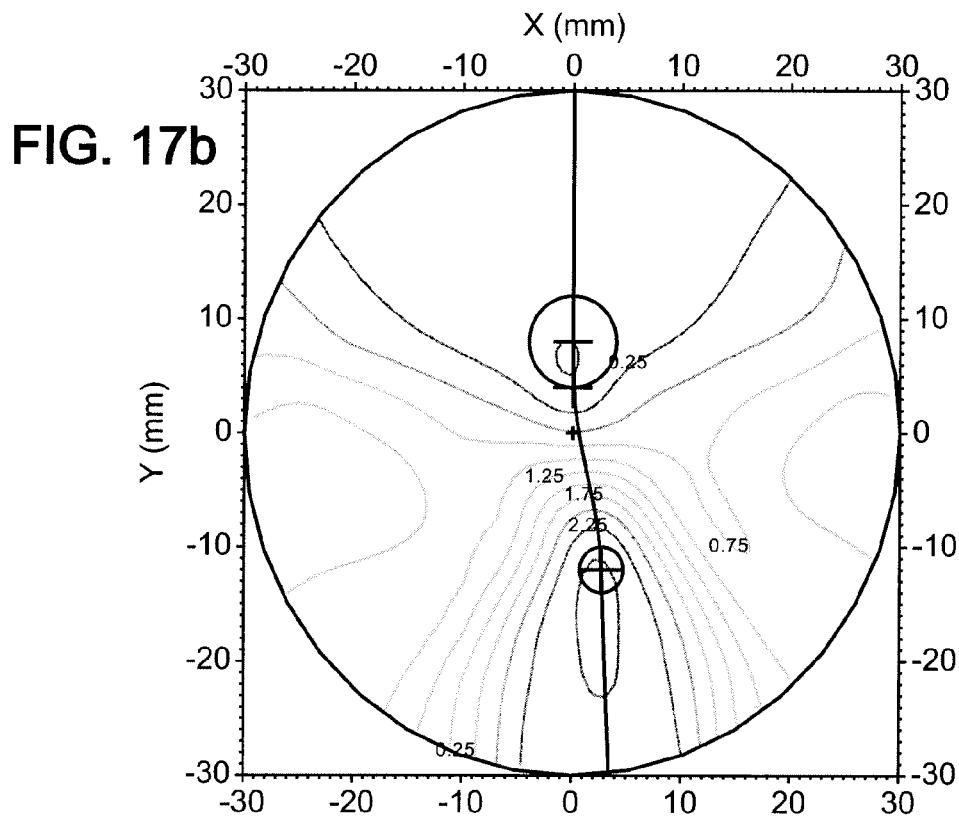
Figure 17C:
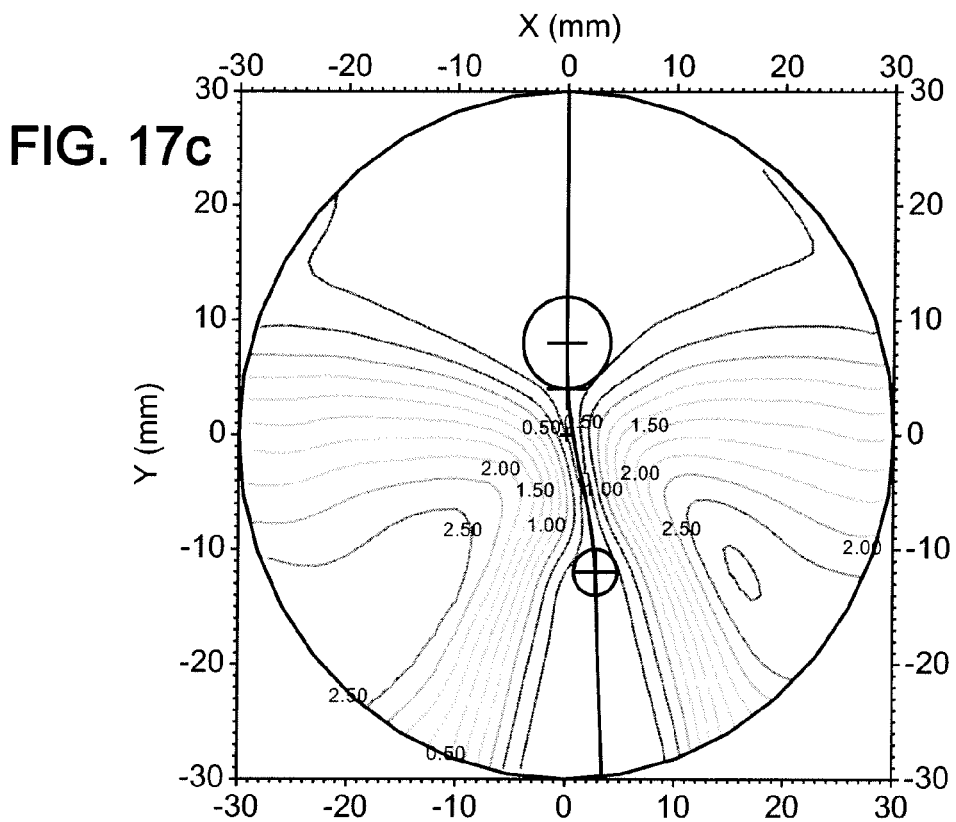

FIGS. 17a, 17b and 17c represent respectively the sphere profile along the meridian line, the sphere contour plot and the cylinder contour plot of the optical reference surface used in example 1.

Figure 18A:
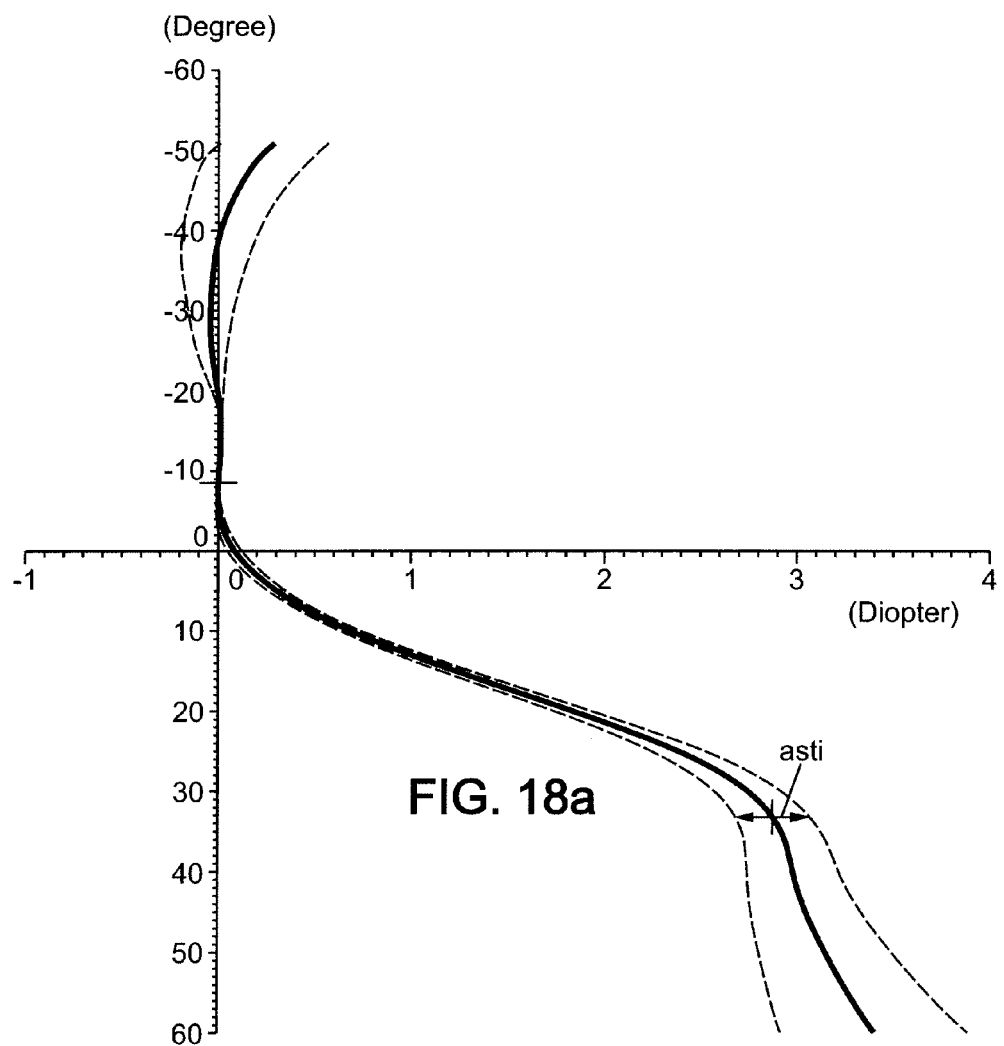
Figure 18B:
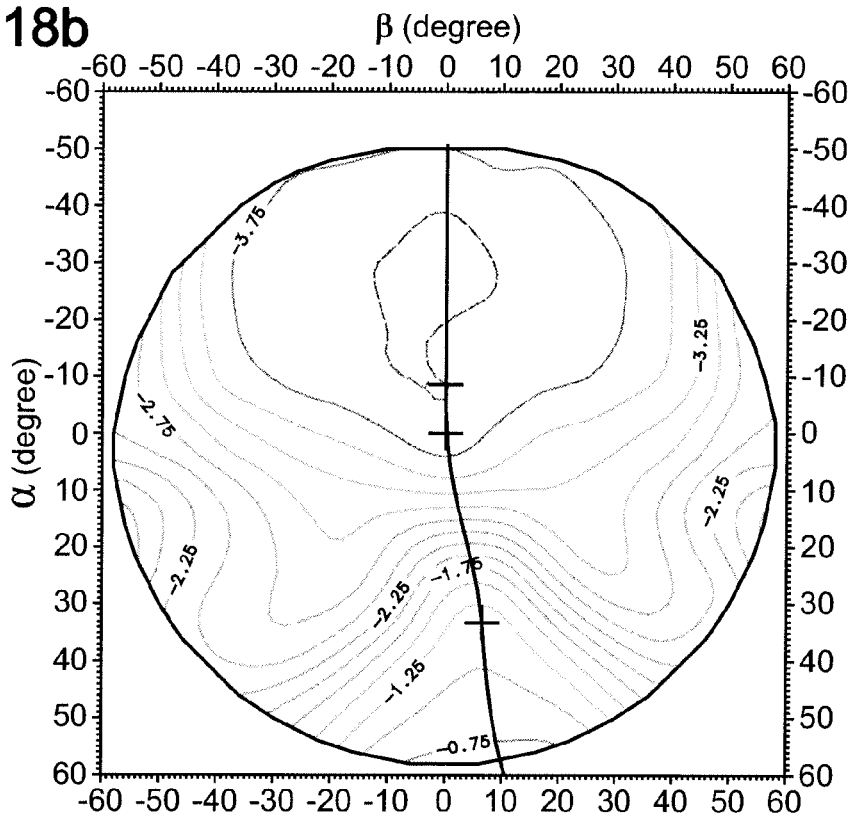
Figure 18C:
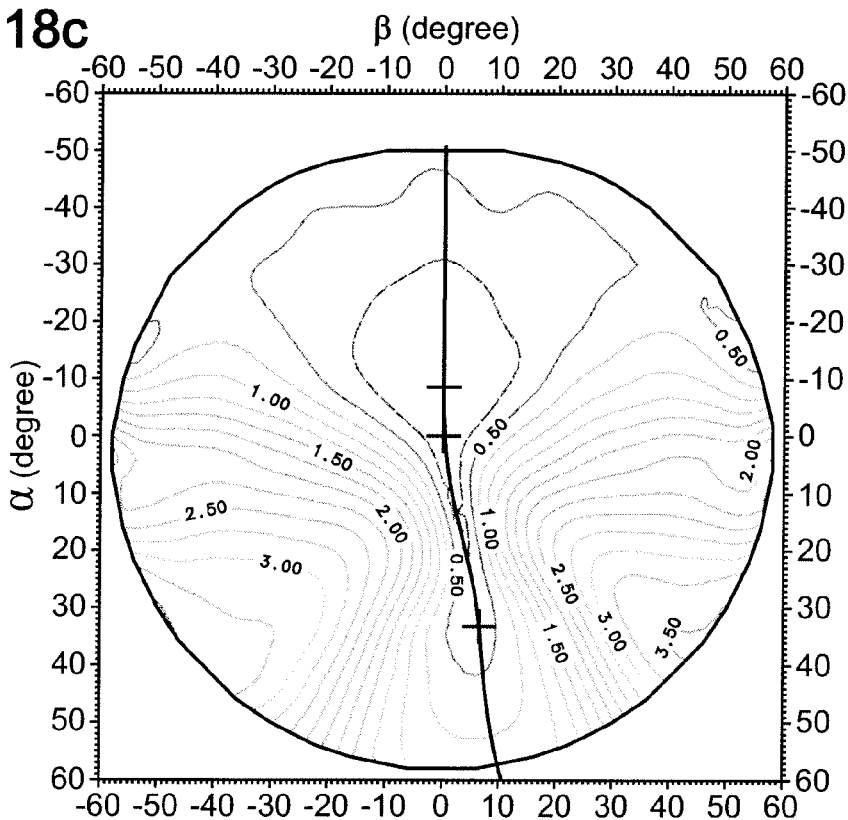

FIGS. 18a, 18b and 18c represent respectively the power profile along the meridian line, the power contour plot and the astigmatism contour plot of the progressive addition lens according to example 1 obtained using a prior art method.

Figure 19A:
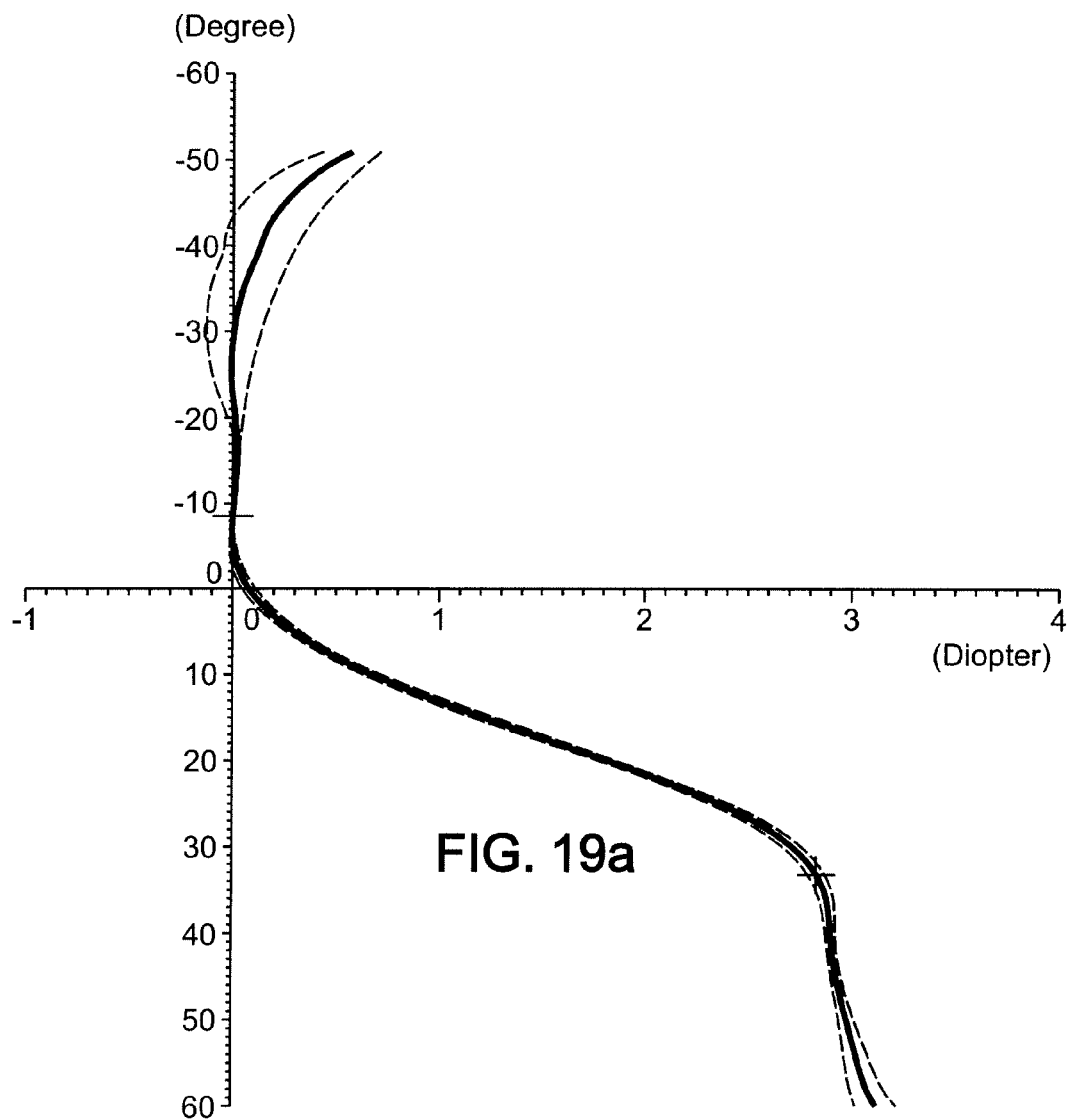
Figure 19B:
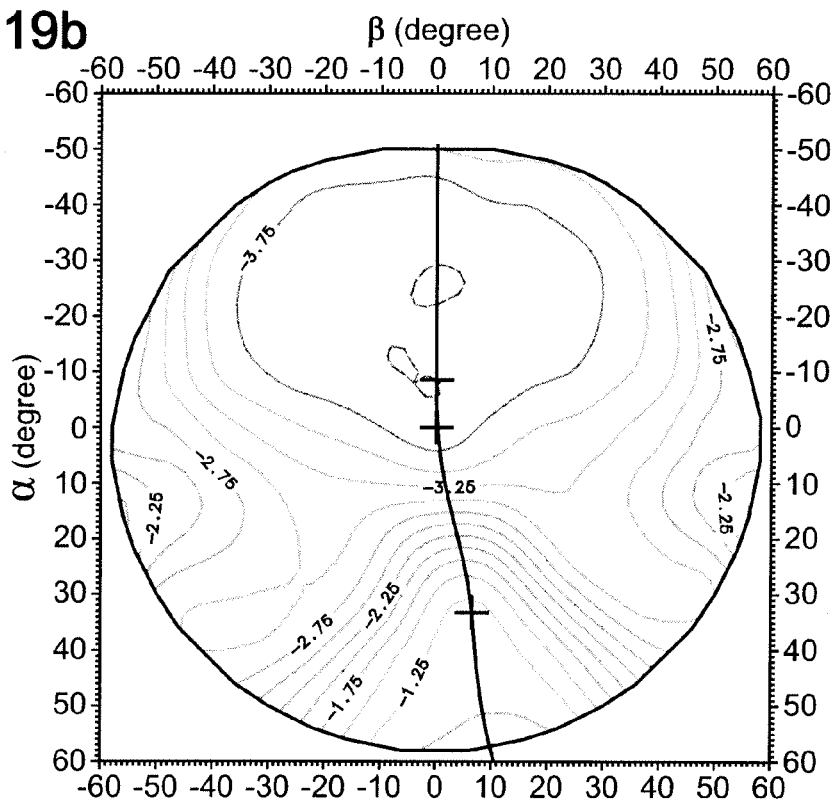
Figure 19C:
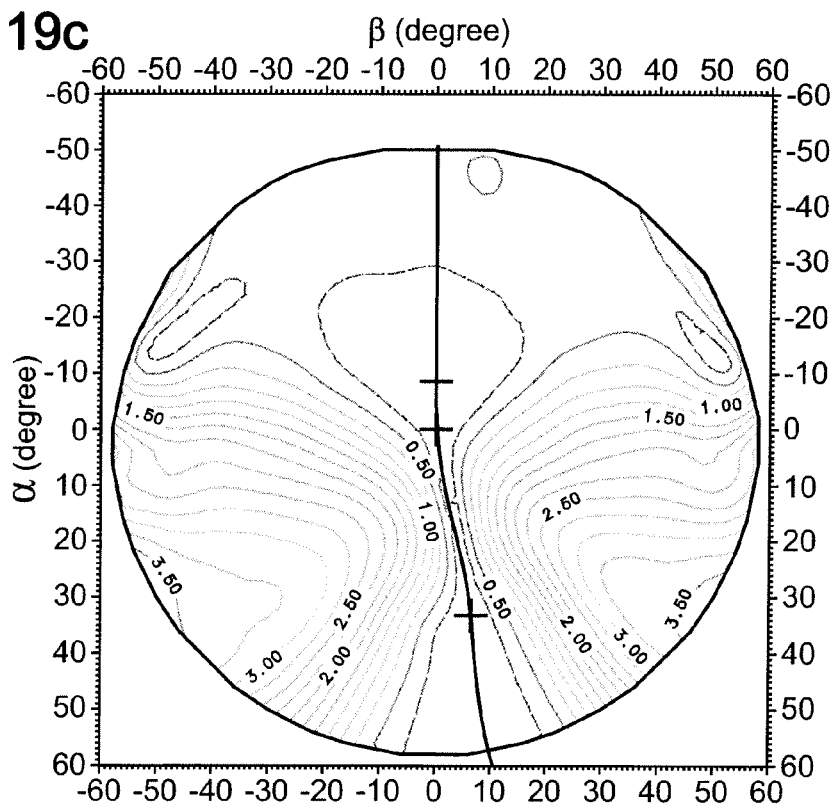

FIGS. 19*a*, 19*b* and 19*c* represent respectively the power profile along the meridian line, the power contour plot and the astigmatism contour plot of the progressive addition lens according to example 1 obtained using the method of the invention.

Figure 20A:
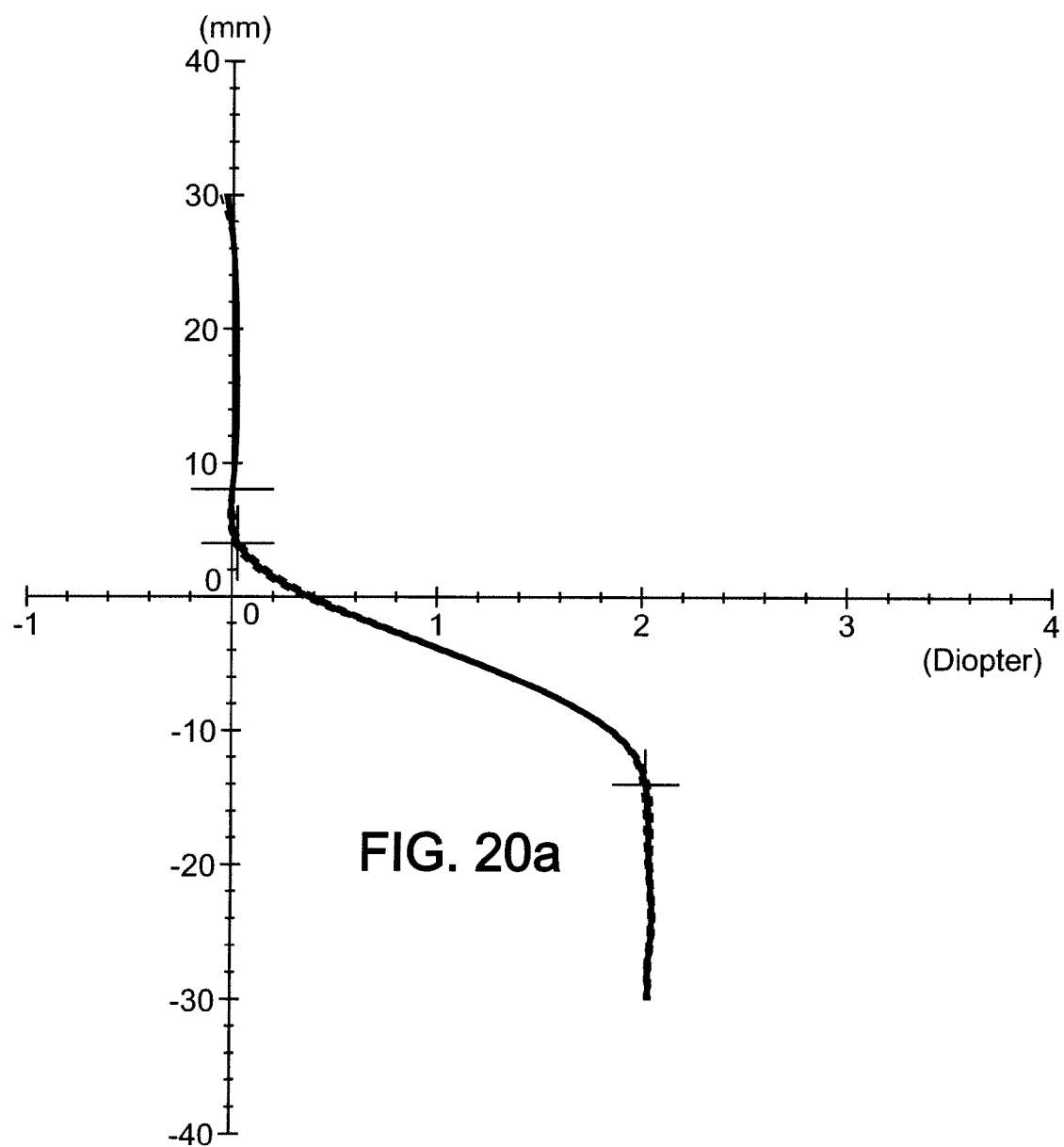
Figure 20B:
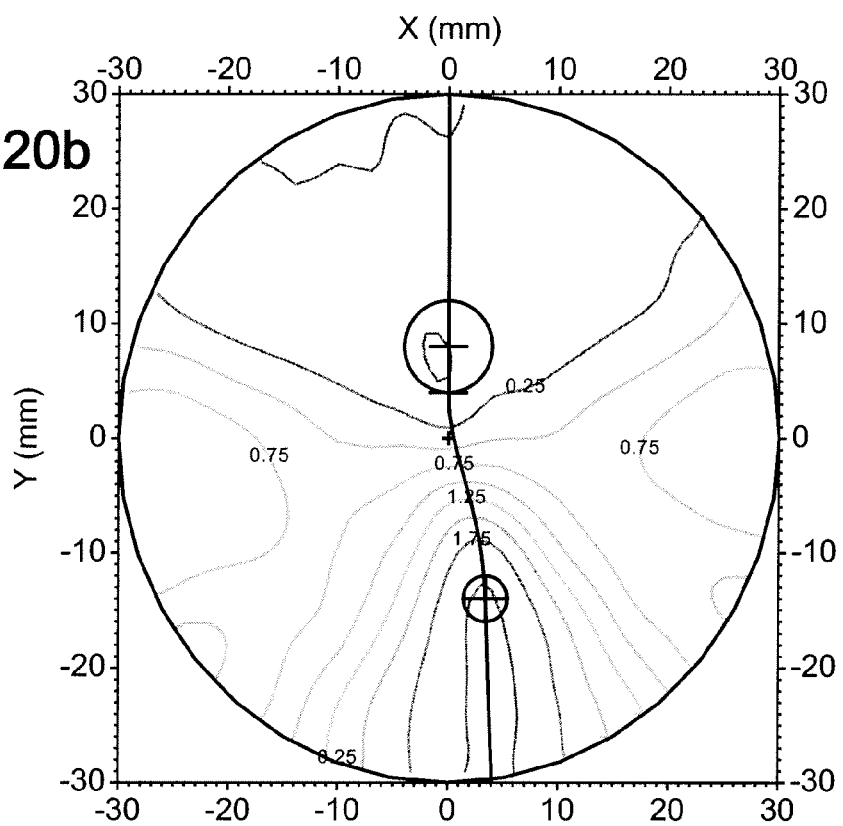
Figure 20C:
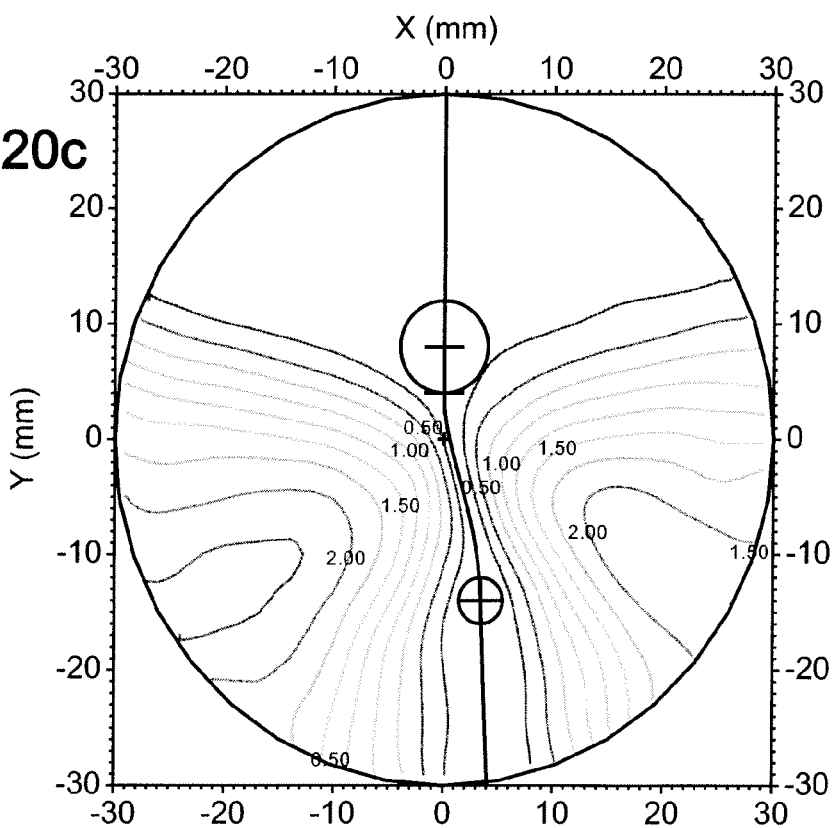

FIGS. 20*a*, 20*b* and 20*c* represent respectively the sphere profile along the meridian line, the sphere contour plot and the cylinder contour plot of the optical reference surface used in example 2.

Figure 21A:
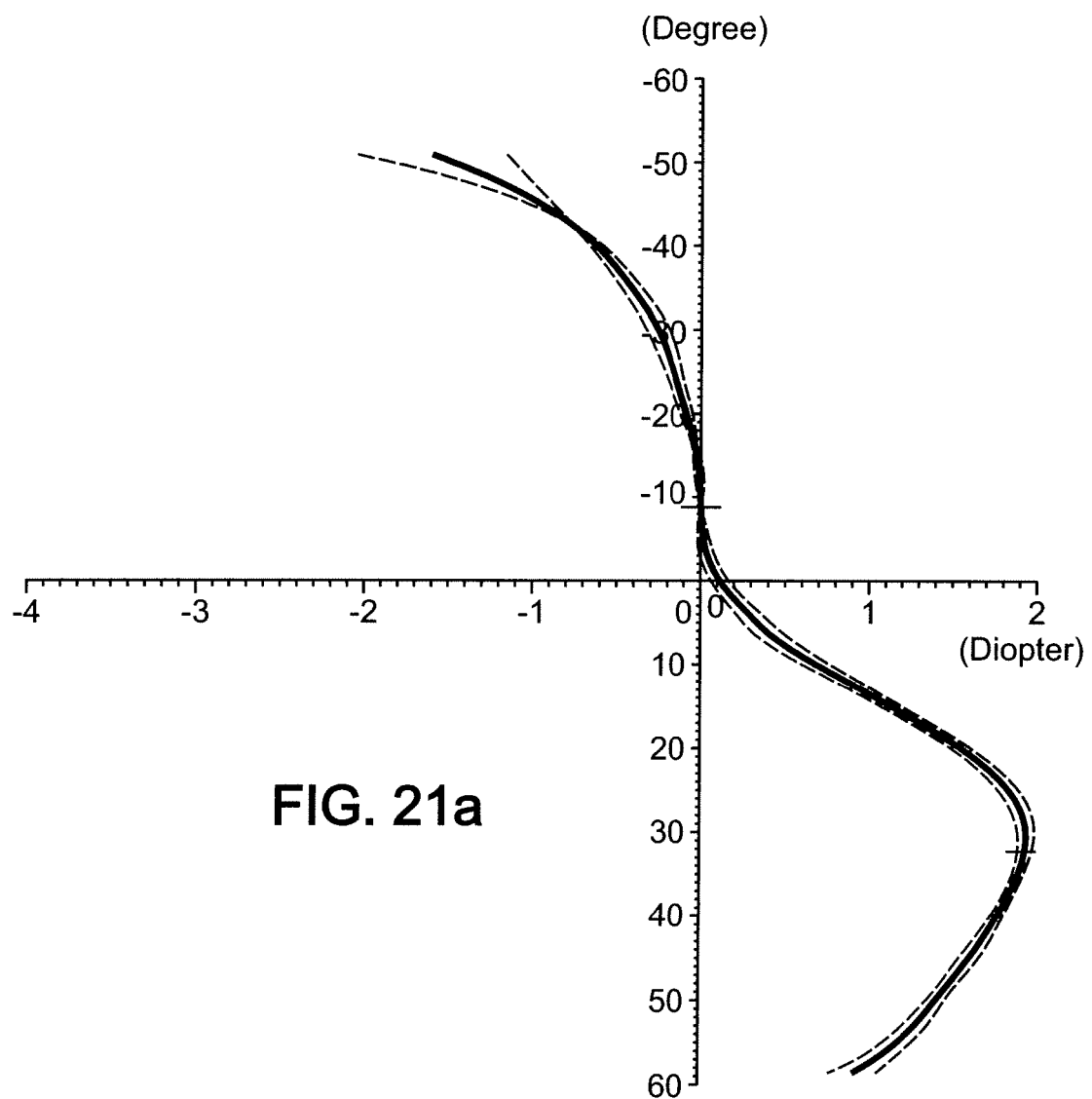
Figure 21B:
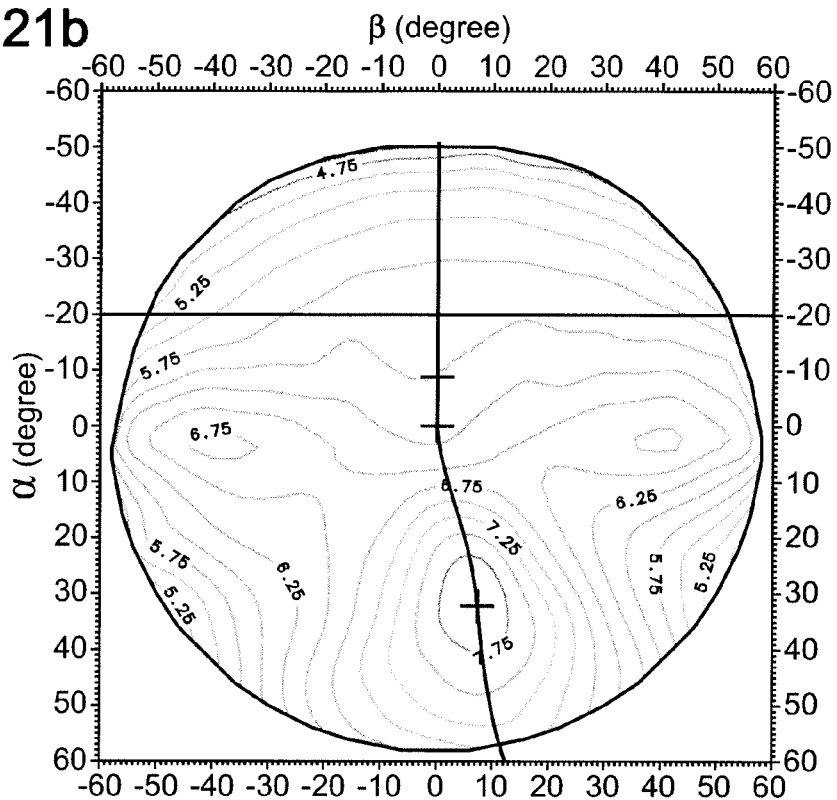
Figure 21C:
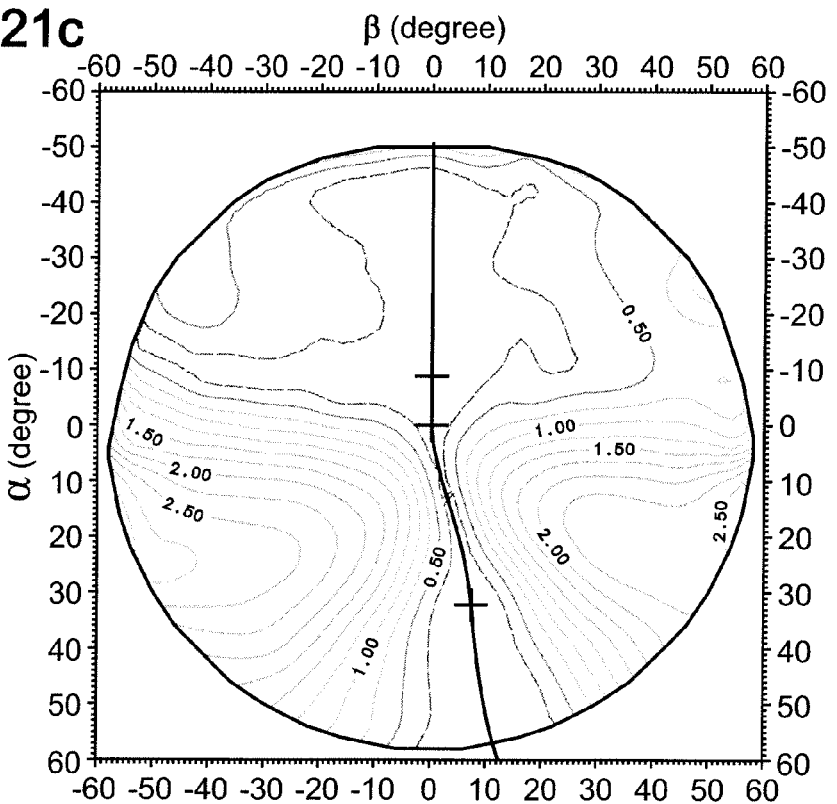

FIGS. 21*a*, 21*b* and 21*c* represent respectively the power profile along the meridian line, the power contour plot and the astigmatism contour plot of the progressive addition lens according to example 2 obtained using a prior art method.

Figure 22A:
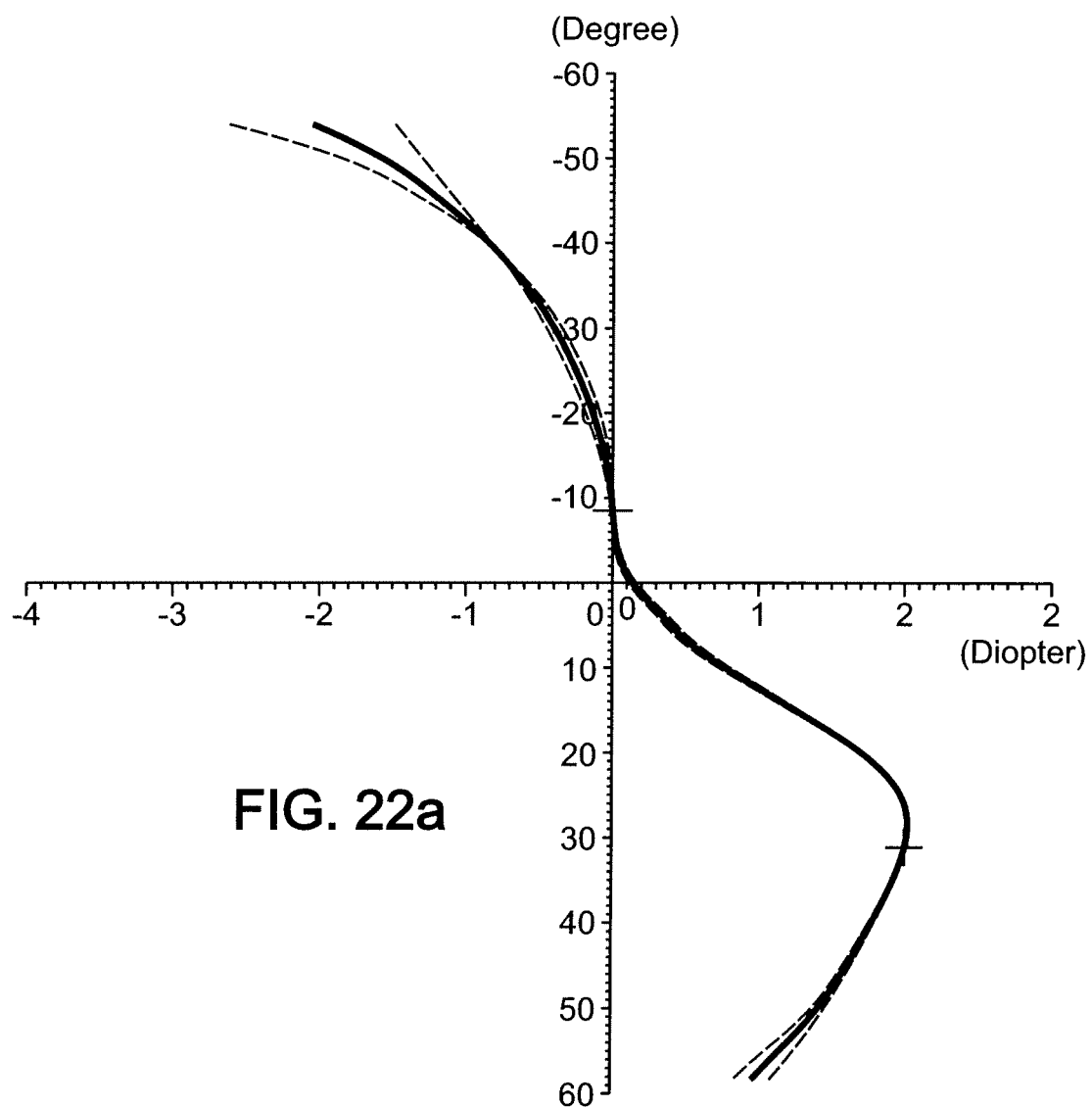
Figure 22B:
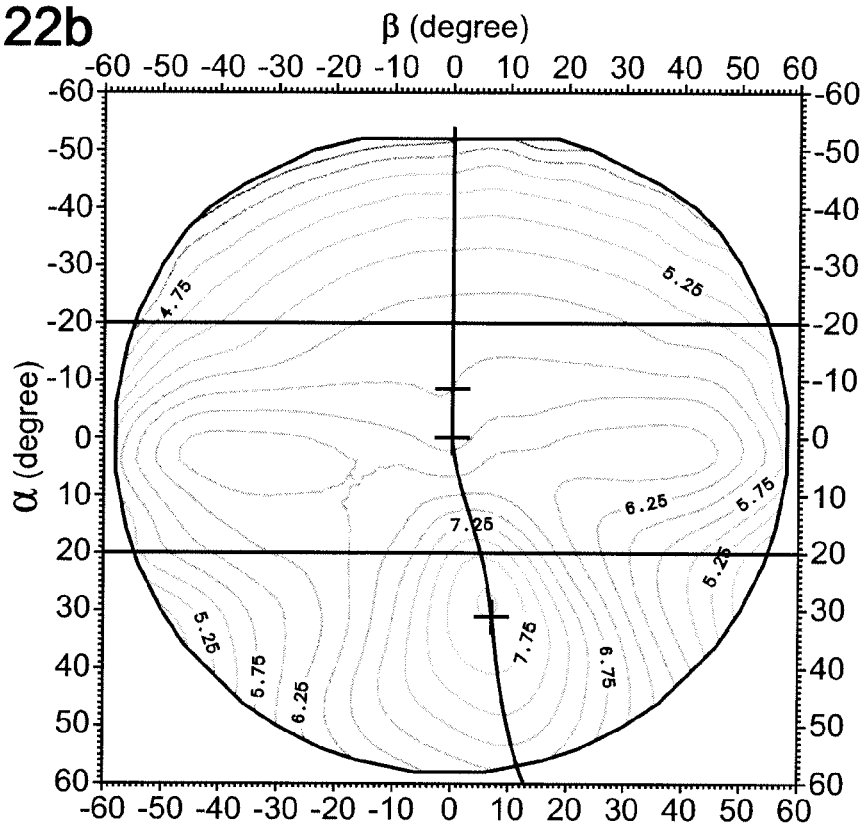
Figure 22C:
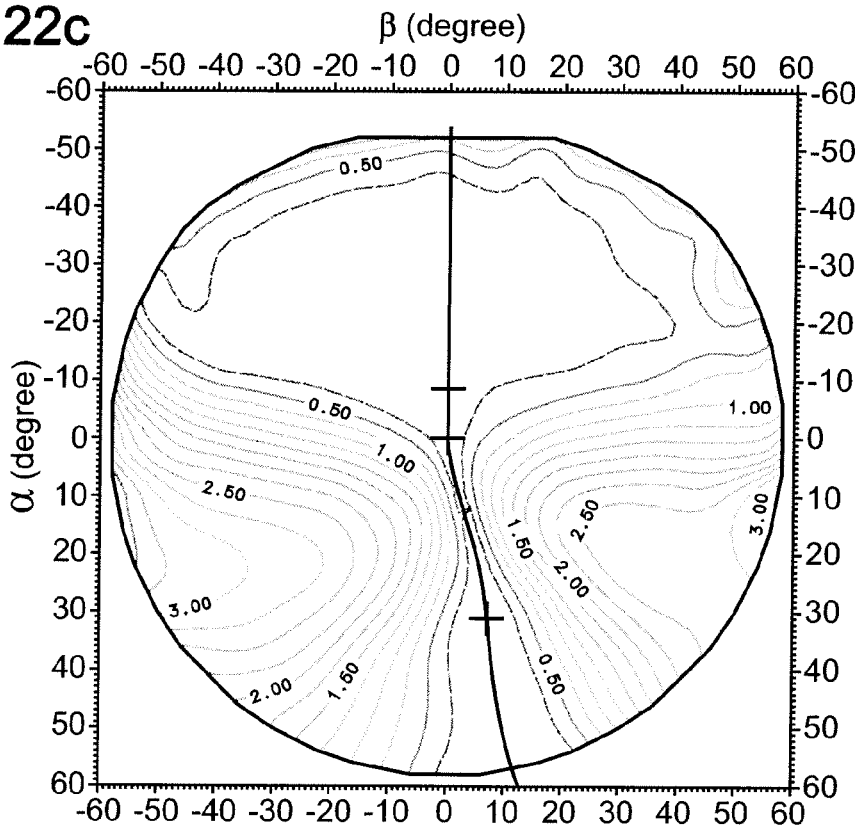

FIGS. 22*a*, 22*b* and 22*c* represent the power profile along the meridian line, the power contour plot and the astigmatism contour plot of the progressive addition lens according to example 2 obtained using the method of the invention.

Figure 23A:
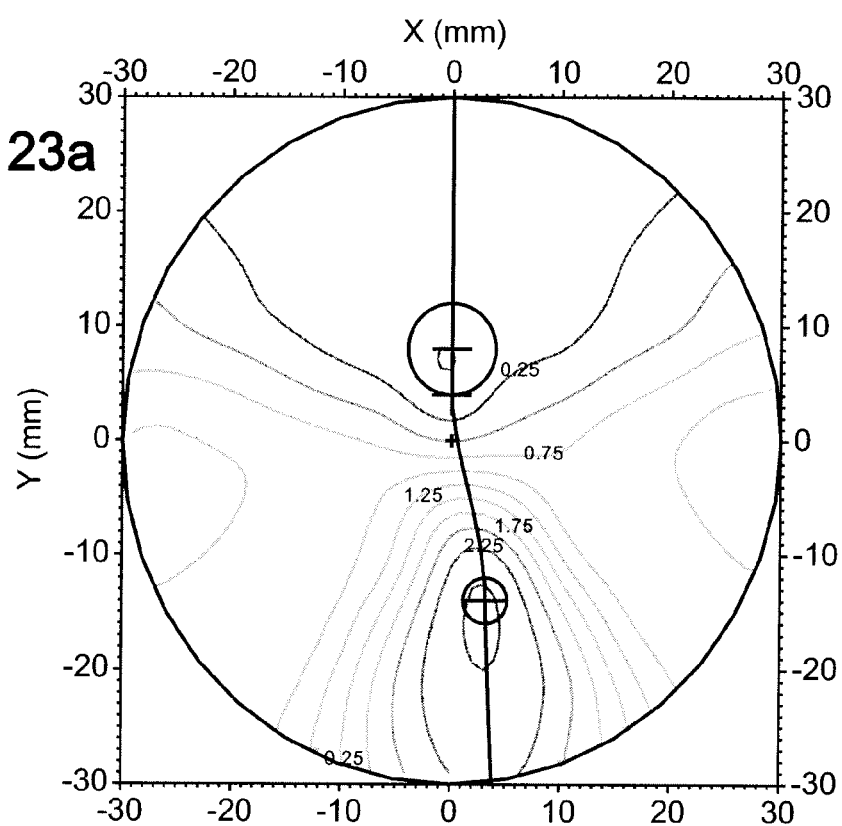
Figure 23B:
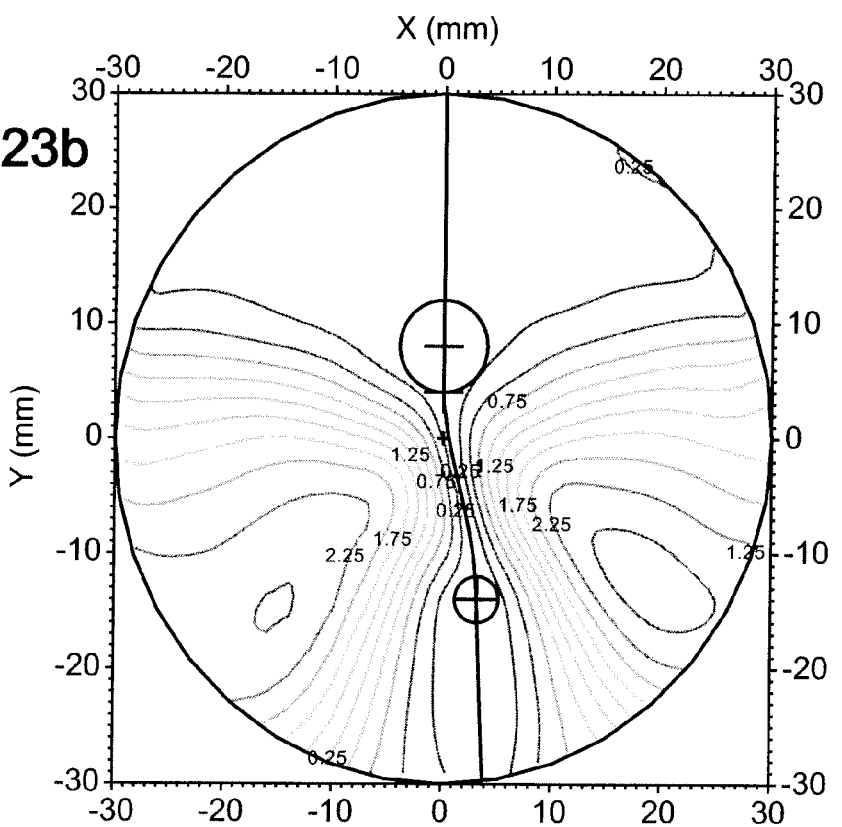

FIGS. 23*a* and 23*b* represent respectively the sphere contour plot and the cylinder contour plot of the optical reference surface used in example 3.

Figure 24A:
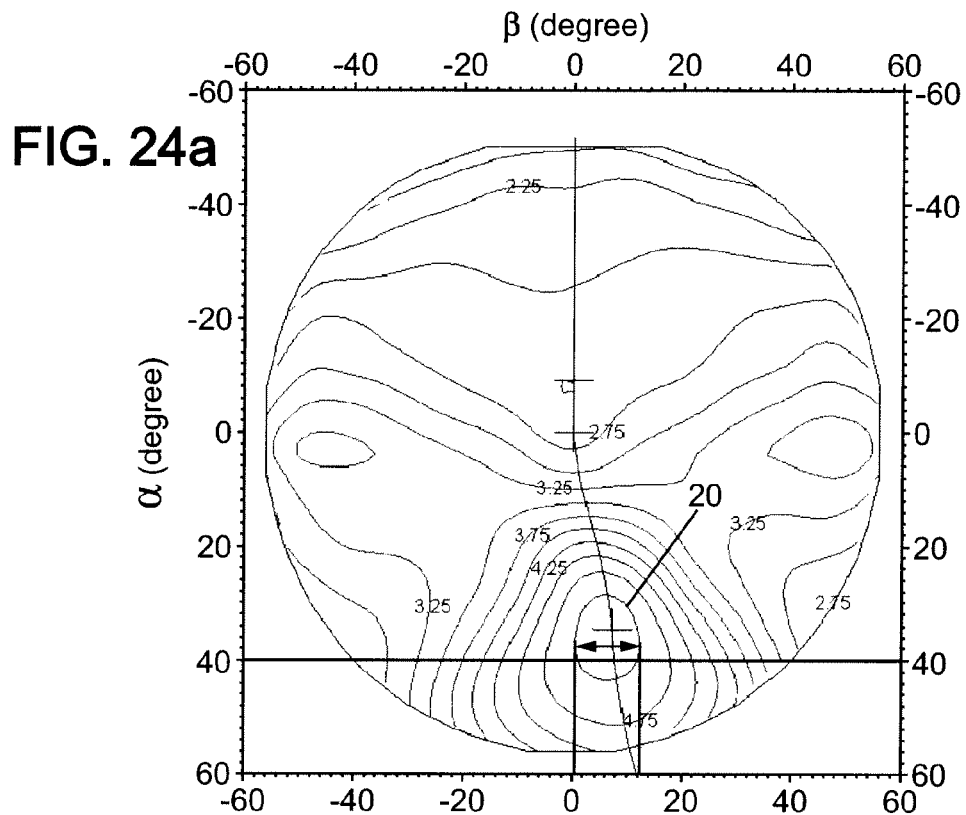
Figure 24B:
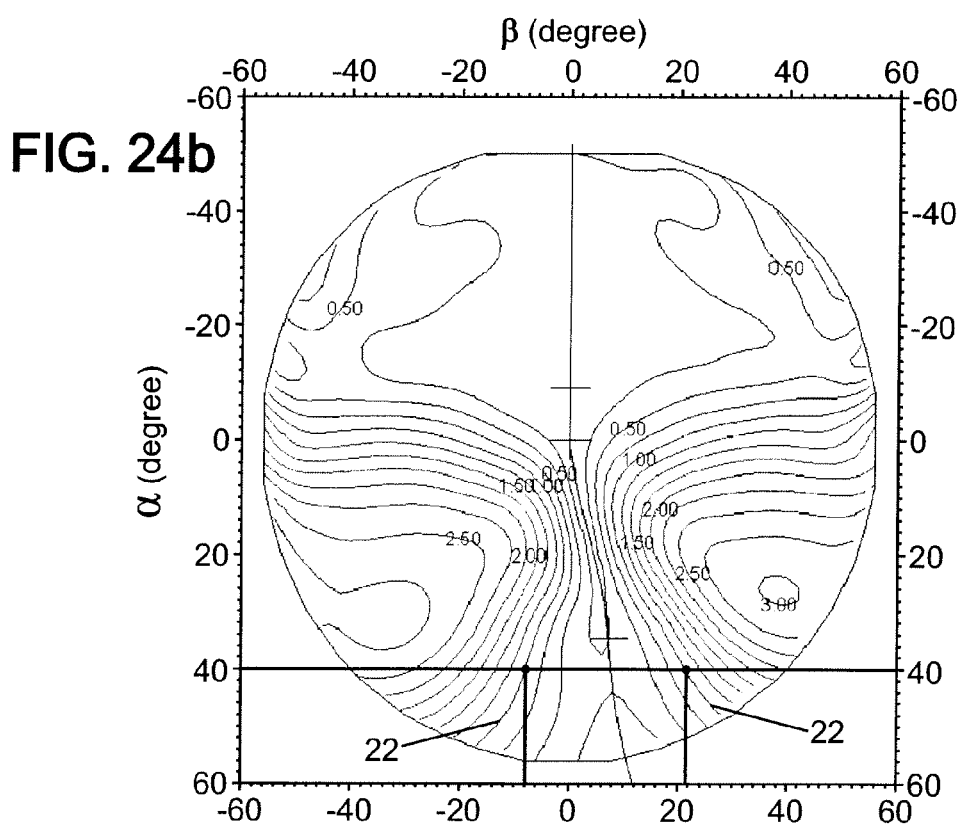

FIGS. 24*a* and 24*b* represent respectively the power contour plot and the astigmatism contour plot of the progressive addition lens according to example 3 obtained using a prior art method.

Figure 25A:
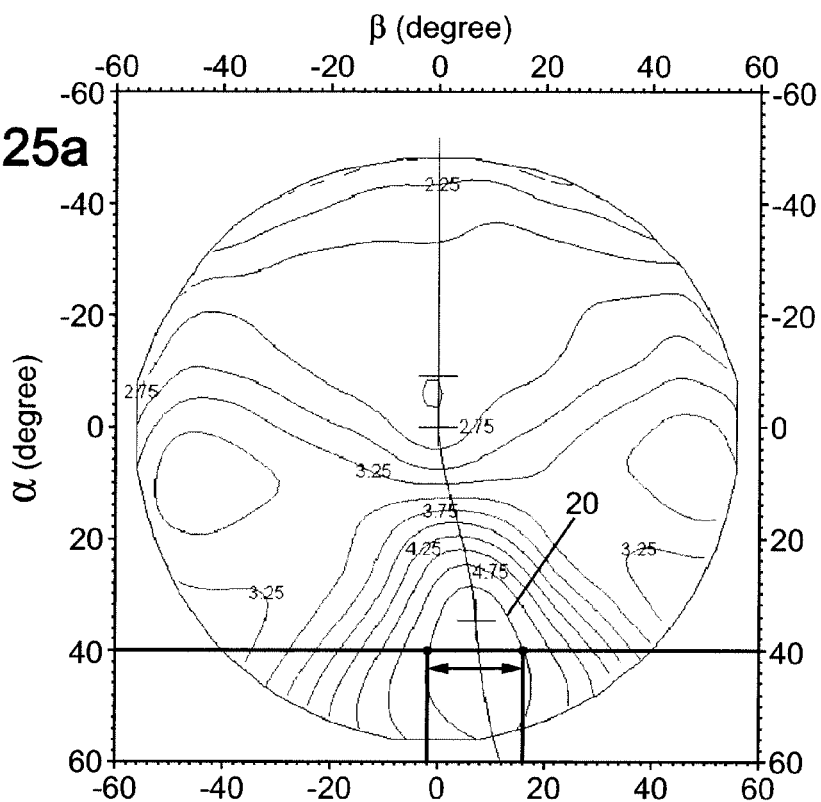
Figure 25B:
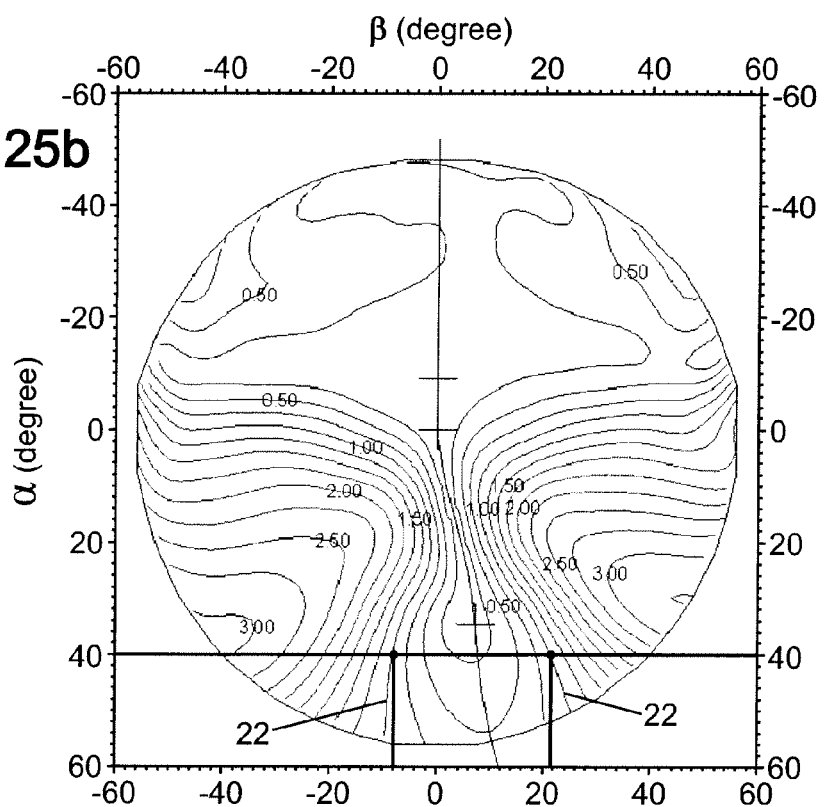

FIGS. 25*a* and 25*b* represent the power contour plot and the astigmatism contour plot of the progressive addition lens according to example 3 obtained using the method of the invention.

Figure 26A:
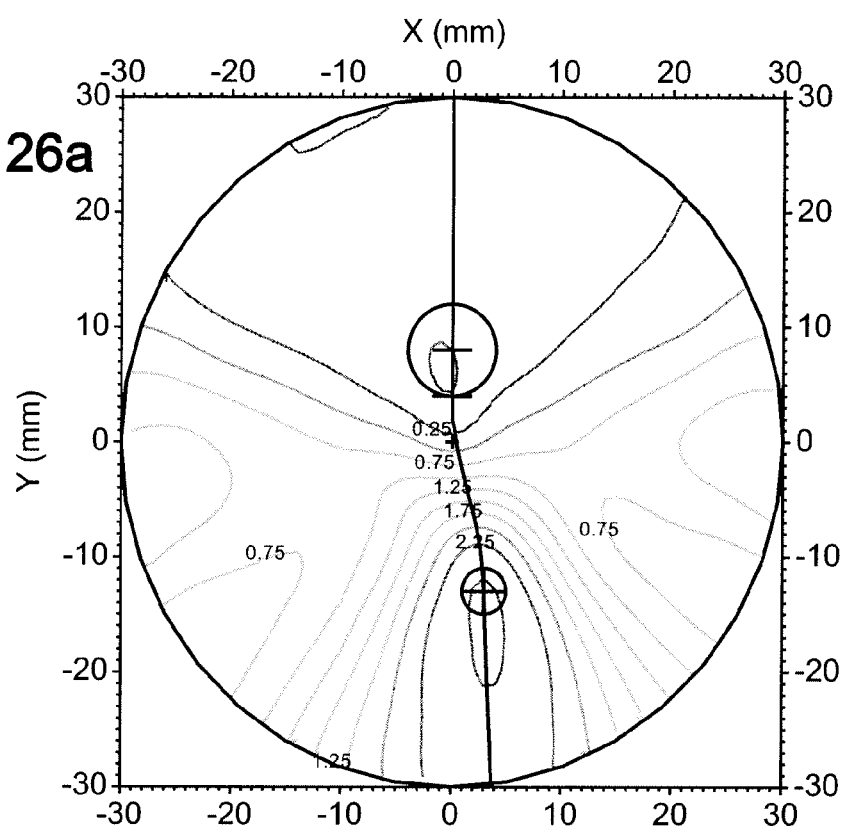
Figure 26B:
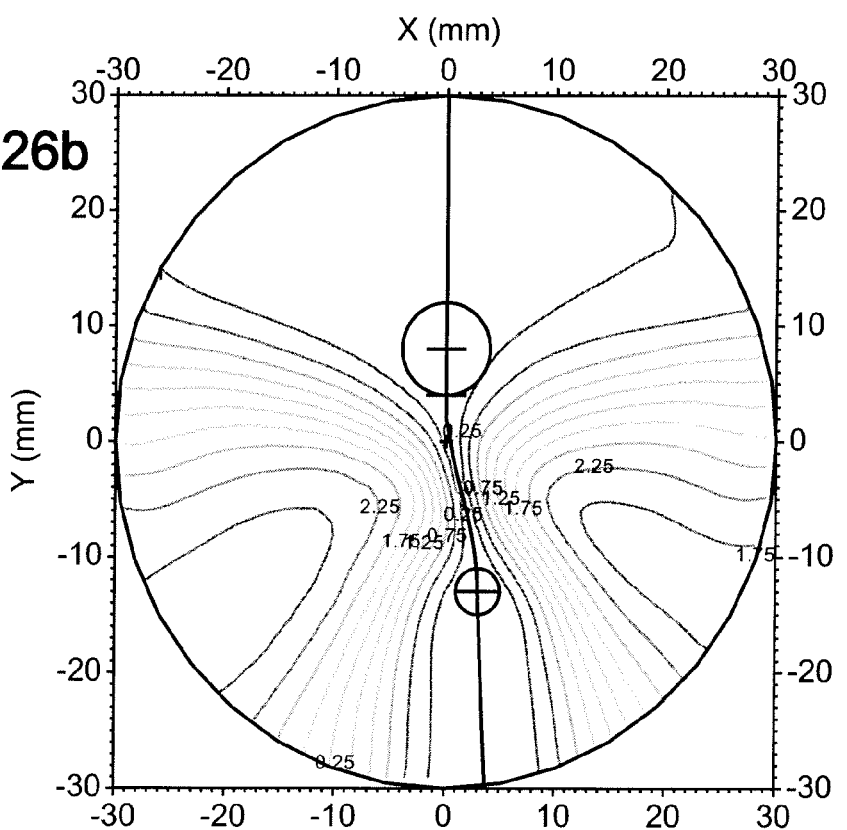

FIGS. 26*a* and 26*b* represent respectively the sphere contour plot and the cylinder contour plot of the optical reference surface used in example 4.

Figure 27:
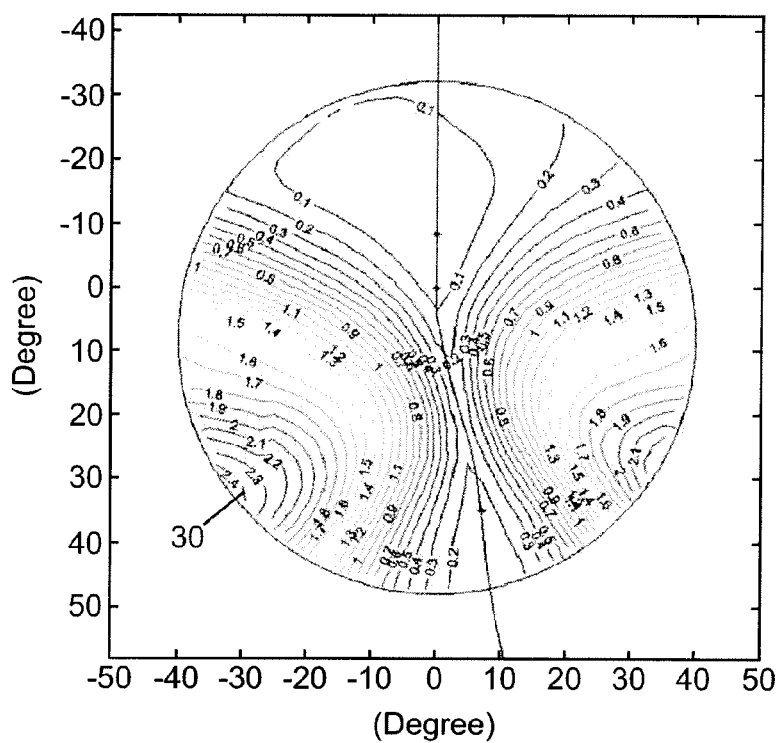

FIG. 27 represents the higher-order aberration RMS plot of the progressive addition surface of an ophthalmic lens according to example 4 obtained using a prior art method.

Figure 28:
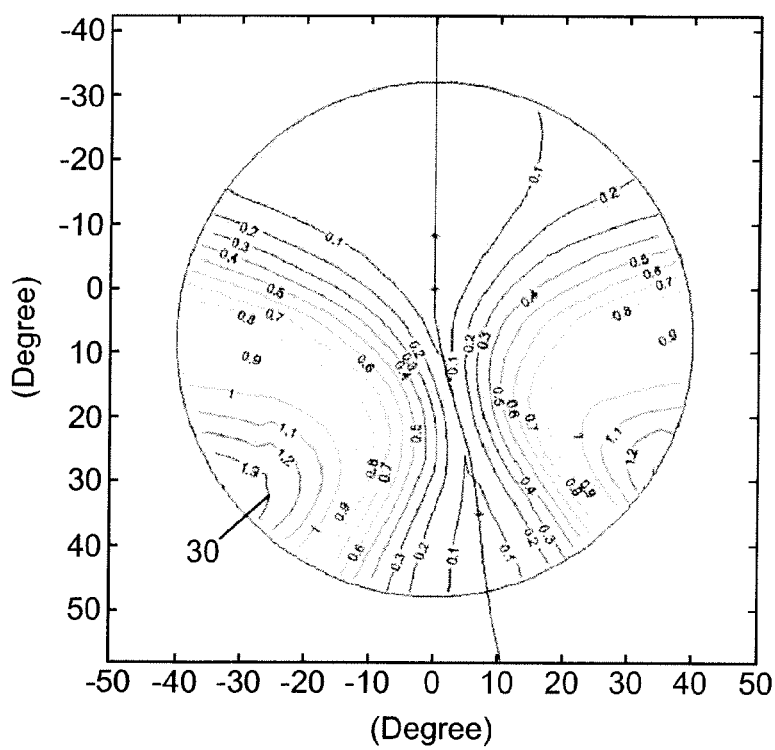

FIG. 28 represents the higher-order aberration RMS plot of the progressive addition surface of an ophthalmic lens according to example 4 obtained using the method of the invention.

Skilled artisans can appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

FIGS. 17, 20, 23 and 26 give geometrical characteristics of the considered optical surfaces. The horizontal axis of FIGS. 17*a*, and 20*a* indicate the variations of the mean sphere along the meridian line with respect to the mean sphere value at the far vision control point. The x-axis is graduated in dioptres and y-axis values are in mm. The continuous curve corresponds to the mean sphere values. The broken curves correspond to the maximum and the minimum sphere values.

FIGS. 17*b*, 20*b*, 23*a*, 26*a* are mean sphere contour plots. The vertical and horizontal coordinates of the maps are in mm. The curves indicated in these maps connect positions which correspond to a same mean sphere value. The respective mean sphere values for the curves are incremented by 0.25 diopter between neighbouring curves, and are indicated on some of these curves.

FIGS. 17*c*, 20*c*, 23*b*, 26*b* are cylinder contour plots, with coordinates similar to those of the mean sphere contour plots. The curves indicated connect positions corresponding to a same cylinder value.

FIGS. 18, 19, 21, 22, 24 and 25 give optical analyses of the considered lenses. The horizontal axis of FIGS. 18*a*, 19*a*, 21*a* and 22*a* indicate the variations of the optical power along the meridian line with respect to the optical power value produced for the gaze direction corresponding to the far vision control point. The vertical axis indicates the values of the eye declination angle α, with positive values for eye directions oriented downwards. The reference eye direction is defined for the fitting cross. The continuous curve corresponds to the mean optical power, which is calculated as an average value for planes containing the eye direction and rotated about this direction. The broken curves correspond to the maximum and the minimum optical power value produced in these planes.

FIGS. 18*b*, 19*b*, 21*b*, 22*b*, 24*a* and 25*a* are optical power maps. The vertical and horizontal coordinates of the maps are the values of the eye declination angle α and the eye azimuth angle β. The curves indicated in these maps connect eye directions which correspond to a same optical power value. The respective optical power values for the curves are incremented by 0.25 diopter between neighbouring curves, and are indicated on some of these curves.

FIGS. 18*c*, 19*c*, 21*c*, 22*c*, 24*b* and 25*b* are residual astigmatism contour plots, with coordinates similar to those of the optical power maps. The curves indicated connect eye directions corresponding to a same astigmatism value.

Figure 1:
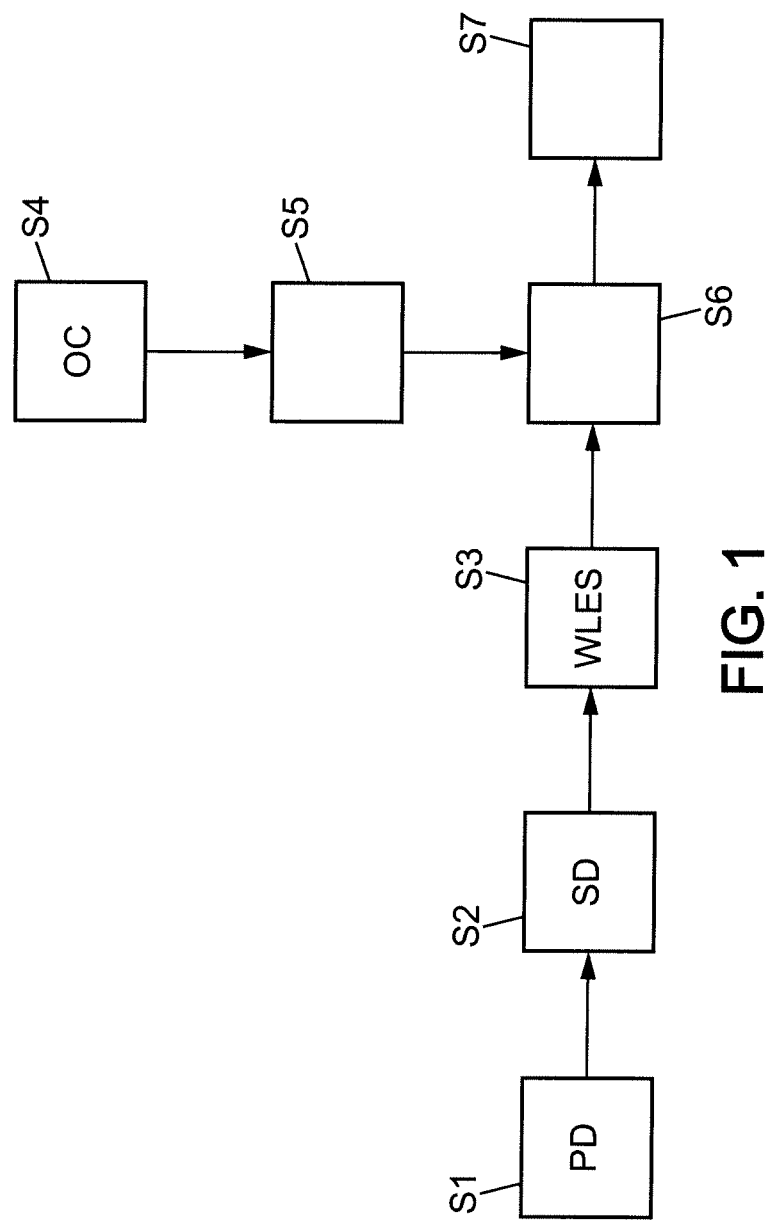
FIG. 1 represents a flowchart of the steps of a method according to the invention.

According to an embodiment of the invention illustrated on FIG. 1, the method of determining the optical performance of a spectacle lens comprises:
  a prescription data providing step S1,
  an optical reference surface data providing step S2,
  a virtual wearer-ophthalmic lens-ergorama system determining step S3,
  a criteria selecting step S4,
  a target value defining step S5,
  an evaluation step S6, and
  a modification step S7.

During the prescription data providing step S1, prescription data PD representing the prescription of the wearer are provided.

During the optical reference surface data providing step S2, surface data SD representing an optical reference surface adapted to the prescription of the wearer are provided.

During the virtual wearer-ophthalmic lens-ergorama system determining step S3, a virtual wearer-ophthalmic lens-ergorama system WLES is determined using at least the prescription and surface data.

According to an embodiment of the invention, the virtual wearer-ophthalmic lens-ergorama system WLES is determined may be determined by using prescription data that are issue from a transformation of the wearer's prescription. An example of such transformation is described in U.S. Pat. No. 6,382,789.

According to an embodiment of the invention, the virtual wearer-opthalmic lens-ergorama system determining step S3 may comprise:
  a eyes characteristics providing step S31,
  a spectacle lens providing step S32, and
  an ergorama providing step S33.

During the eyes characteristics providing step S31, eyes characteristics data representing the characteristics of the right and/or left eyes of the wearer are provided.

The eyes characteristics data may comprise measured values, for example monocular inter-pupillary distance or pupil height, or the relative position of the left and right eyes of the wearer or the position of the centre of rotation (CRE) of the right and/or left eyes. Advantageously, having measured values increases the accuracy of the overall method.

The eyes characteristics data may comprise average values based on known average values of the relative position of the left and right eyes of the wearer.

During the pair of spectacle lenses providing step S32, spectacle data representing the spectacle lens are provided.

According to an embodiment of the invention, the spectacle data comprise mounting data of the spectacle lenses.

According to an embodiment of the invention, the mounting data may be average mounting data.

According to an embodiment of the invention, the spectacle data comprise for the right and left spectacle lenses the vertex distance and/or the pantoscopic angle and/or the wrap angle of the spectacle lens.

During the ergorama providing step S33, ergorama data are provided. The ergorama data represent a visual environment that gives the distance of object points as a function of the gaze direction.

During the criteria selecting step S4, at least one optical criterion OC of the optical function associated with the virtual wearer-ophthalmic lens-ergorama system is selected.

The optical criterion may be selected in the central vision criteria group consisting of: the power in central vision, the astigmatism in central vision, higher-order aberrations in central vision, the acuity in central vision, the contrast in central vision, the prismatic deviation in central vision, the ocular deviation, the object visual field in central vision, the image visual field in central vision, the magnification in central vision and a variation of preceding criteria.

According to an embodiment of the invention the central vision criteria group consisting of: the power in central vision, the astigmatism in central vision, higher-order aberrations in central vision.

According to an embodiment of the invention, the optical criterion may be selected in the peripheral vision criteria group consisting of: the power in peripheral vision, the astigmatism in peripheral vision, higher-order aberrations in peripheral vision, the pupil field ray deviation, the object visual field in peripheral vision, the image visual field in peripheral vision, the prismatic deviation in peripheral vision, the magnification in peripheral vision, and a variation of preceding criteria.

According to an embodiment of the invention, the optical criterion may be selected in the global optical criteria group consisting of the magnification of the eyes and the temple shift.

During the target value defining step S5, at least a target value for the at least selected criterion is defined or provided.

During the evaluation step S6 the evaluated value of the at least selected optical criterion of the optical function associated with the virtual wearer-ophthalmic lens-ergorama system is evaluated.

According to an embodiment of the invention, during the target value defining step S5 for each selected criterion is defined:
- an evaluation zone comprising one or several evaluation domains and a set of target values associated to said evaluation domains, if said criterion belongs to the central or to the peripheral vision criteria groups, or
- a target value associated to said criterion, if said criterion belongs to the global optical criteria group, Furthermore, during the evaluation step, if the selected criterion belongs to the central or peripheral vision criteria groups, a set of criterion values associated to evaluation domains is evaluated.

During the modification step S7, at least one parameter of the virtual wearer-ophthalmic lens-ergorama system different from the base curve of the ophthalmic lens is modified, in order to minimize the difference between the target value and the evaluation criterion value.

According to an embodiment of the invention, the at least one parameter of the virtual wearer-ophthalmic lens-ergorama system is selected among the eyes parameter group consisting of: the diameter of the pupil, the position of the pupil, the position of the center of rotation of the eye, the position of the different diopter of the eye, for example the retina, the curvature of the different diopter of the eye, for example the retina, the index of the different environment of the eye.

According to an embodiment of the invention, the at least one parameter of the virtual wearer-ophthalmic lens-ergorama system is selected among the ophthalmic lens parameter group consisting of: the tightness at a given point of the ophthalmic lens, the prism of the ophthalmic lens, the index of the substrate.

According to an embodiment of the invention, the at least one parameter of the virtual wearer-ophthalmic lens-ergorama system is selected among the wearing parameter group consisting of: the vertex distance, pantoscopic angle, the wrap angle.

According to an embodiment of the invention, the at least one parameter of the virtual wearer-ophthalmic lens-ergorama system is selected among the object space parameter group consisting of the repartition of distance as a function of the gaze direction of each eye.

We focus on the criterion evaluation step according to the vision situation (central or peripheral). In order to compute a criterion, ray tracing methods can be used. Ray tracing has special features according to the virtual wearer-ophthalmic lens-ergorama system.

Figure 2:
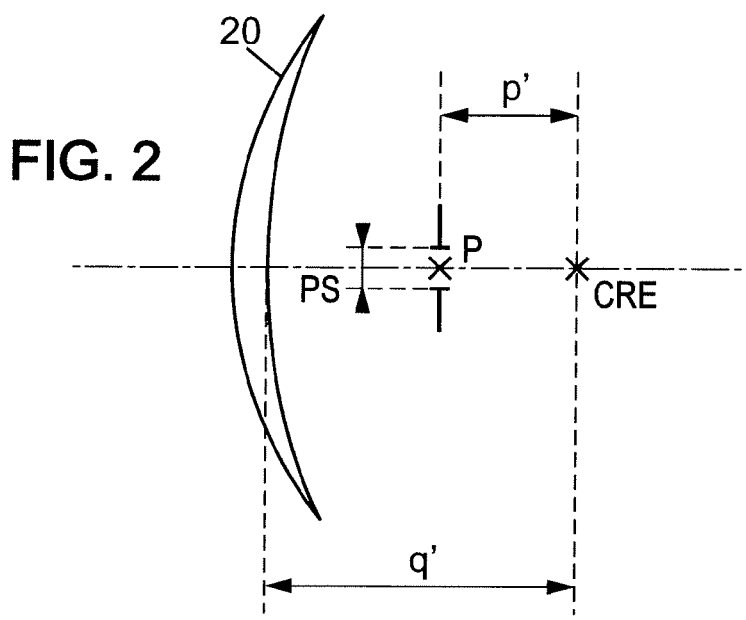
FIG. 2 shows a schematic view of a lens plus eye system.

FIG. 2 illustrates a schematic view of a lens-plus-eye system that may be part of a wearer-ophthalmic lens-ergorama system. Referring to FIG. 2, an eye position can be defined by the centre of rotation of the eye CRE and the entrance pupil central point P. PS is the pupil size (not drawn to scale). The distance q' between the CRE and the lens 20 is generally, but not limited to, set to 25.5 mm, and p' defines the position of the eye entrance pupil with respect to the CRE.

Figure 3:
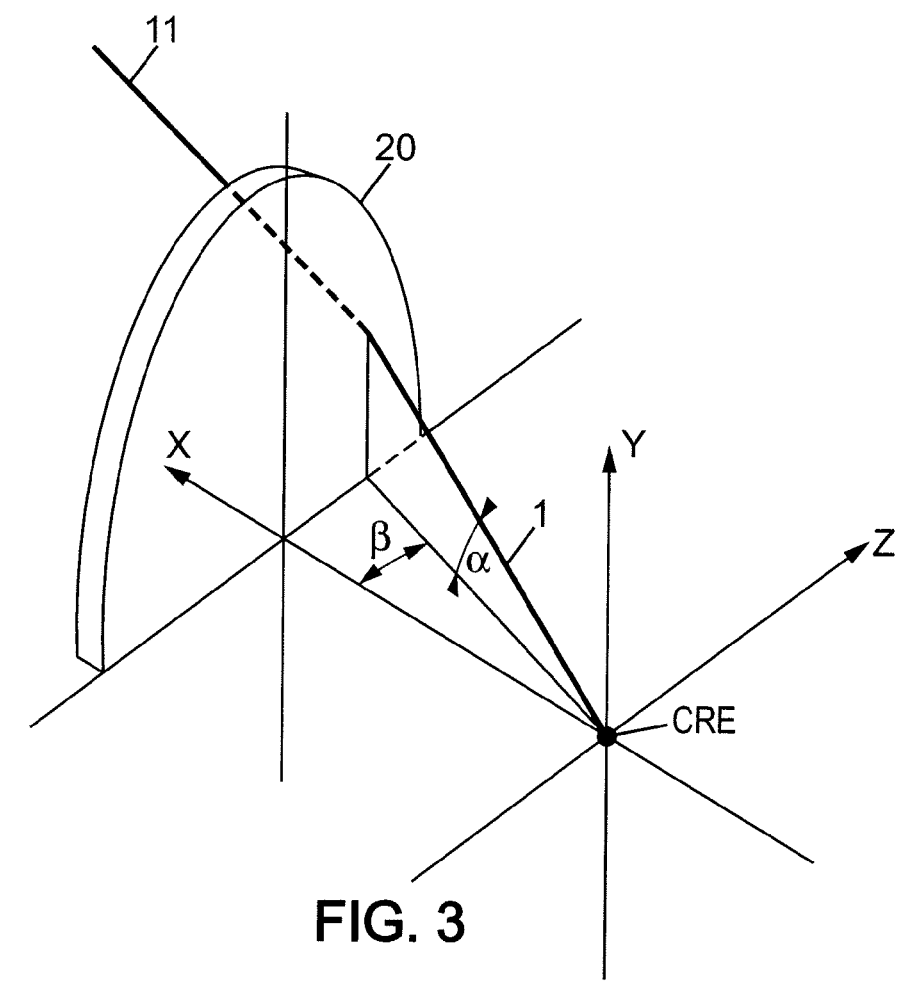
FIG. 3 shows a ray tracing from the center of rotation of the eye.

FIG. 3 illustrates a model for central vision in the purpose of assessing a criterion in a central vision situation by ray tracing. In a central vision situation, the eye rotates about its center of rotation as well as the entrance pupil of the eye. A gaze direction is defined by two angles $(\alpha, \beta)$ measured with regard to reference axes $R=(X,Y,Z)$ centered on the CRE. For assessing a central vision criterion in a gaze direction $(\alpha, \beta)$, a gaze ray 1 is built from the CRE in the gaze direction $(\alpha, \beta)$. 11 is the incident ray after passing through the lens 20.

Figure 4:
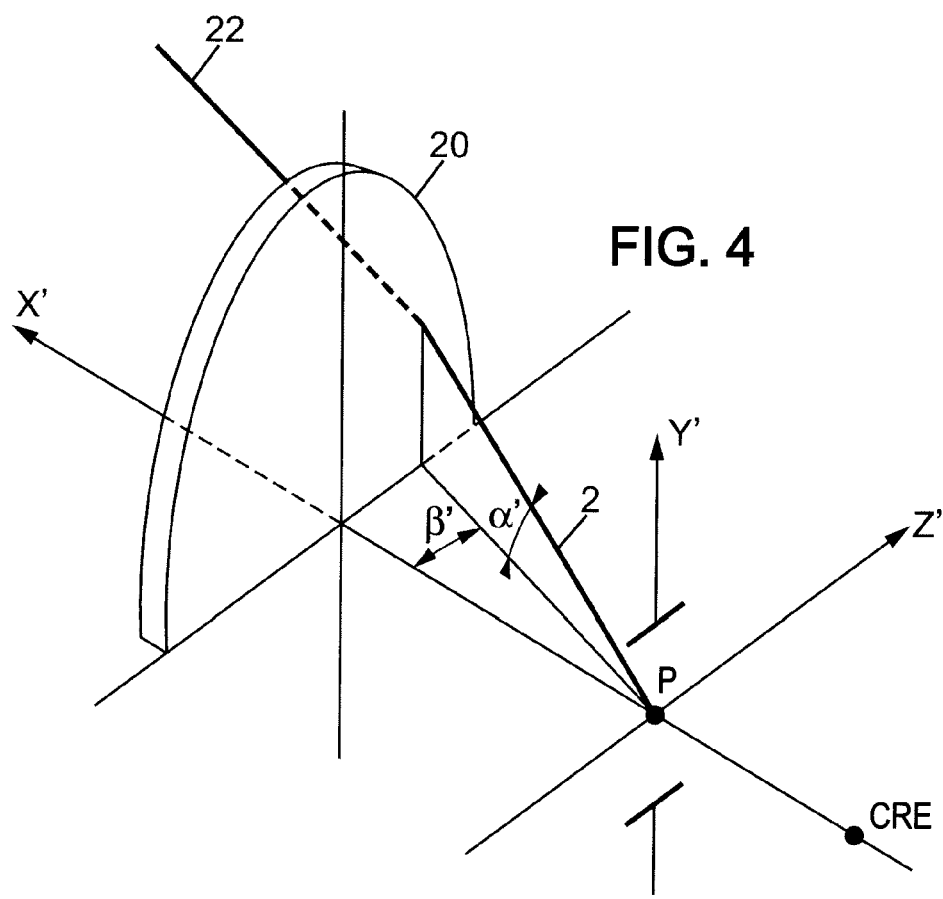
FIG. 4 shows a ray tracing from the center of the eye entrance pupil.

FIG. 4 illustrates a model for peripheral vision in the purpose of assessing a criterion in a peripheral vision situation through ray tracing. In a peripheral vision situation, a gaze direction $(\alpha, \beta)$ (not represented here) is fixed, and an object is viewed in a peripheral ray direction different from the gaze direction. A peripheral ray direction is defined by two angles $(\alpha', \beta')$ measured with regard to reference axes $R'=(X', Y', Z')$ centered on the eye entrance pupil and moving along the gaze direction axis given by the fixed direction $(\alpha, \beta)$ and represented by axis X' on FIG. 4. For assessing a peripheral vision criterion in a peripheral ray direction $(\alpha', \beta')$, a peripheral ray 2 is built from the center of the pupil P in a peripheral ray direction $(\alpha', \beta')$. 22 is the incident ray after passing through the lens 20.

According to the gaze ray 1 (in central vision) or to the peripheral ray 2 (in peripheral vision), the ray-tracing software computes the corresponding incident ray, alternatively under reference 11 and 22 on FIGS. 3 and 4. Then, an object point is chosen on the ray in the object space and from this object a pencil of rays is built to calculate the final image. Ray tracing enables then to compute the selected criteria.

FIGS. 5 to 13 are now illustrating criterion evaluation method of criteria according to the present invention.

Figure 5:
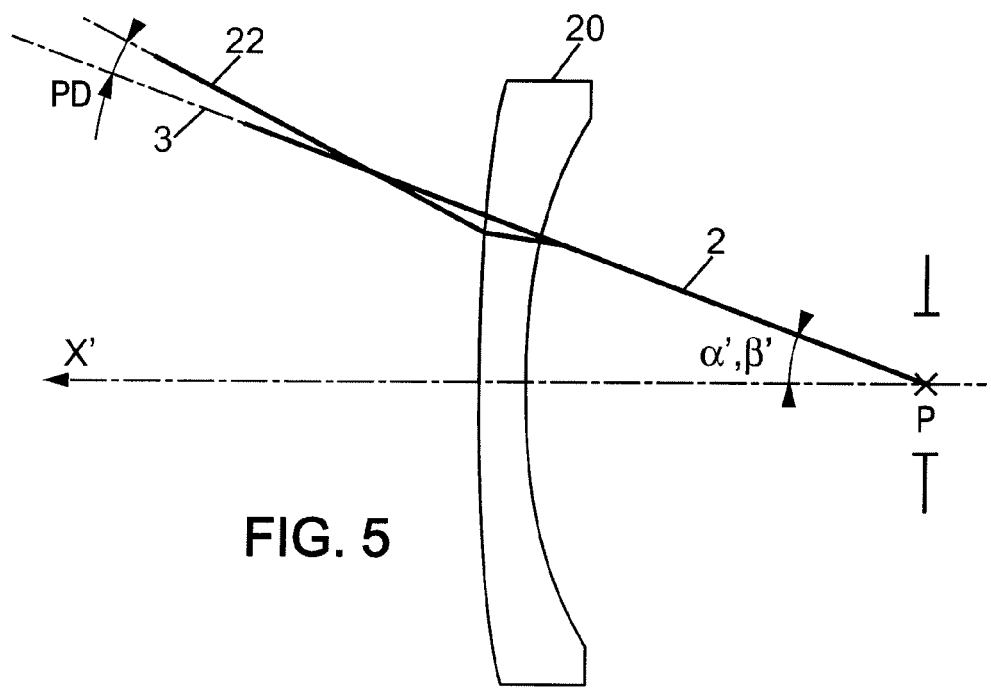
FIG. 5 illustrates prismatic deviation in peripheral vision.

FIG. 5 illustrates ray tracing for estimating prismatic deviation PD in peripheral vision. Prismatic deviation in peripheral vision is estimated through ray tracing of a peripheral ray associated to a peripheral ray direction (α', β') given with regard to reference axes centered on the center of the entrance pupil and moving along the gaze direction, as discussed hereinabove. A ray 2 issued from the center of the entrance pupil in peripheral ray direction (α', β') with the gaze direction axis X' is traced. Incident ray 22 corresponding to ray 2 is then built. Prismatic deviation represents the angle between incident ray 22 and a virtual ray 3 issued from the center of the pupil in the direction of ray 2 and not deviated by the prism of lens 20.

Figure 6:
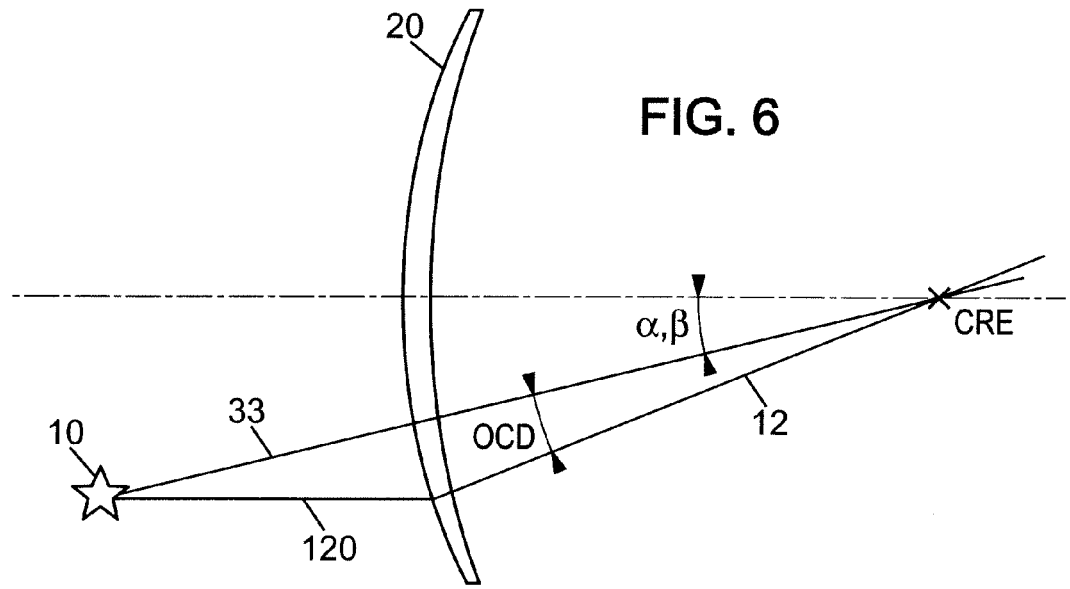
FIG. 6 illustrates ocular deviation.

FIG. 6 describes ocular deviation OCD. It shows a first ray 33 coming from an object 10 when no lens is placed in its path to the CRE, and a second ray 120 coming from the same object whose path is modified by the addition of a lens 20. Ray 12 corresponds to ray 120 in the image space after passing through the lens 20. The ocular deviation OCD in a direction (α, β) is estimated in central vision and is defined as the angle between:
- the direction of the eye targeting an object without lens (represented by ray 33) and
- the direction of the eye targeting the same object when said lens is placed in front of the viewer eye (represented by ray 12).

Figure 7:
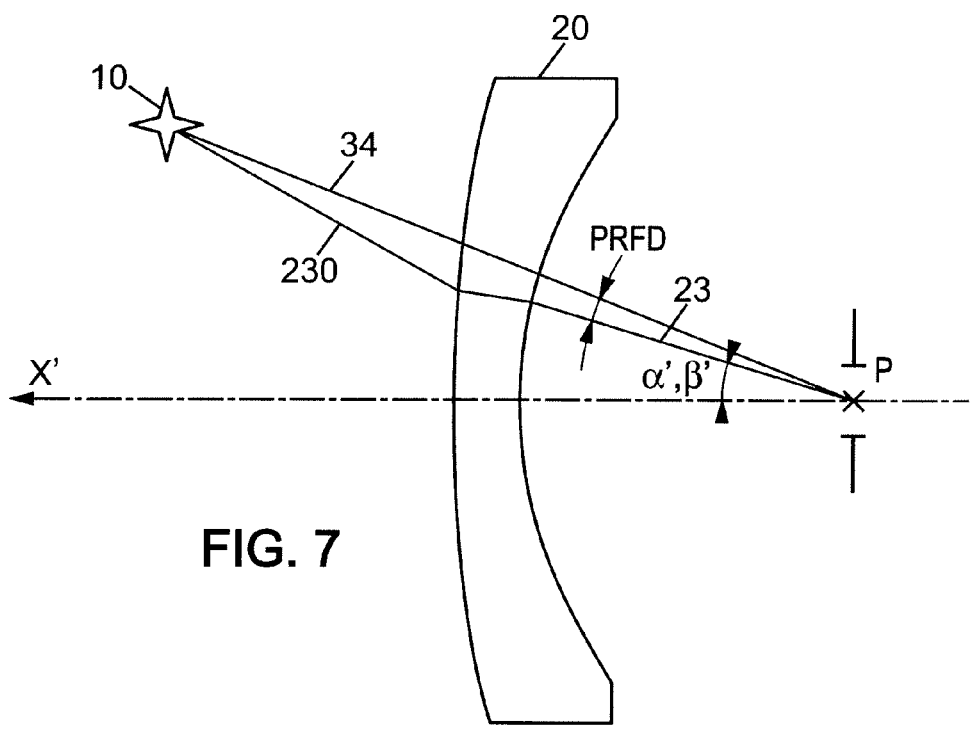
FIG. 7 illustrates pupil ray field deviation.

FIG. 7 illustrates pupil ray field deviation PRFD, it shows a first ray 34 coming from an object 10 located in the peripheral field of view when no lens is placed in its path to the eye entrance pupil, and a second incident ray 230 coming from the same object whose path is modified by the introduction of a lens 20. Ray 23 corresponds in the image field to incident ray 230. Pupil field ray deviation PRFD is estimated in peripheral vision and is defined as the angle, measured in the image space, between
- a straight ray 34 coming from an object localised in the peripheral field of view of an eye and entering the center of the pupil, and
- a ray 23 coming from the same object and entering the center of the pupil when said lens is placed on the eyes of the wearer.

Figure 8:
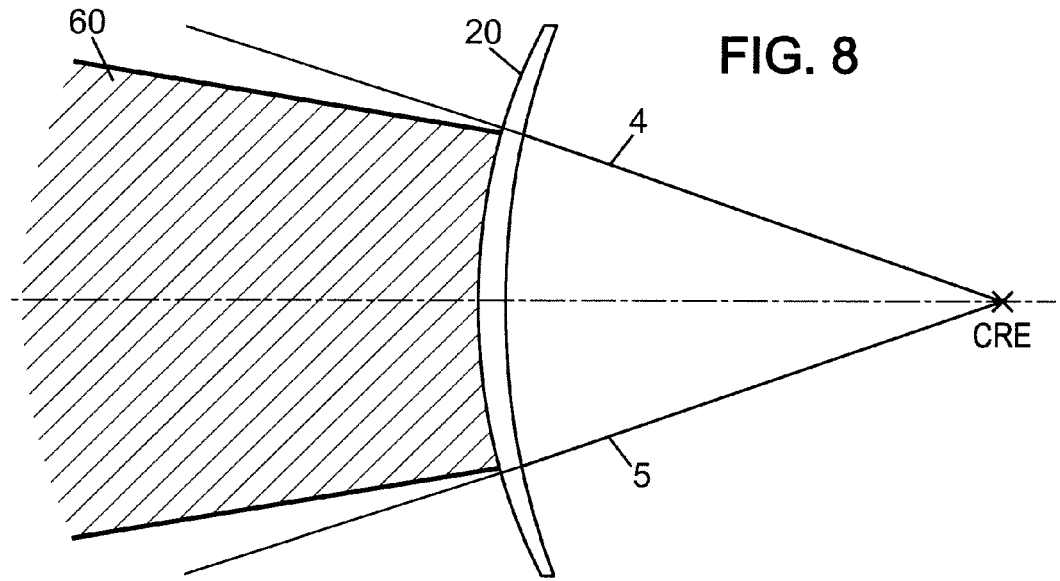
FIG. 8 illustrates object visual field in central vision.

FIG. 8 illustrates object visual field in central vision in a plane and for two arbitrarily chosen rays 4 and 5 issued from the CRE. The object visual field represents the portion of space that the eye can observe scanning an angular portion of the lens determined by ray 4 and ray 5 in the object space. The hatched part 60 represents the object visual field in central vision.

Figure 9:
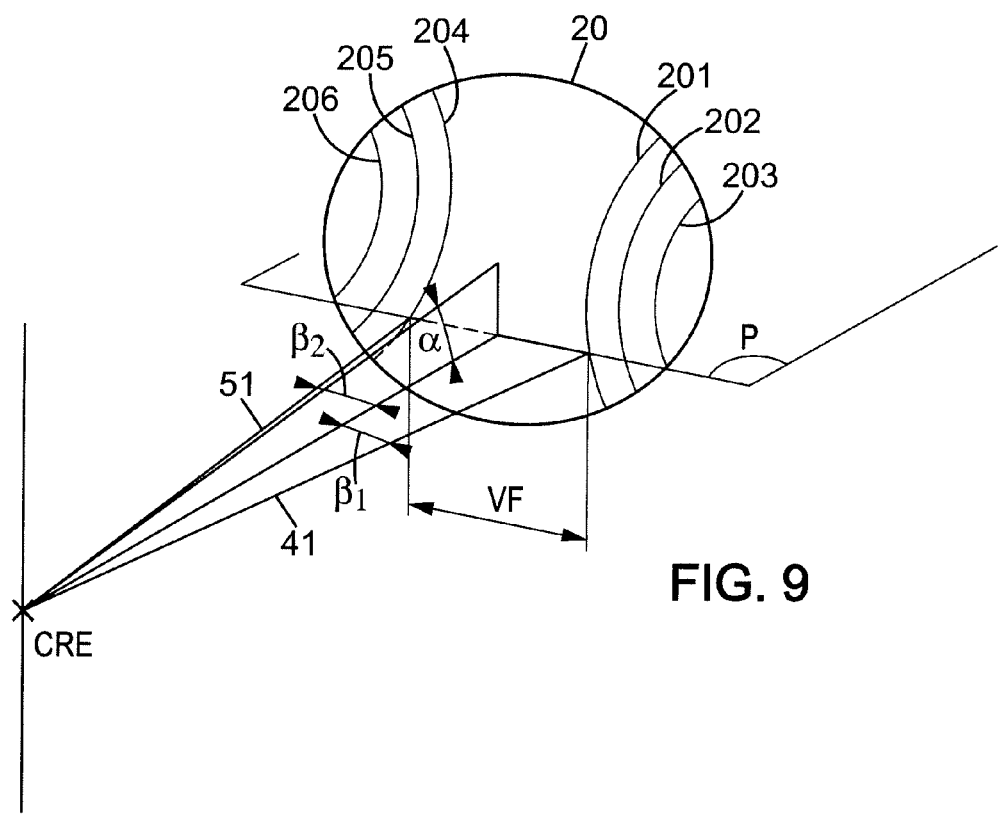
FIG. 9 illustrates horizontal object visual field.

FIG. 9 illustrates an example of visual field VF in central vision for two rays 41 and 51 issued from the CRE. The lens 20 is represented as a surface with isoastigmatism lines 201-206. Rays 41 and 51 are defined as the intersection between a predetermined horizontal axis given by a direction α and two predetermined isoastigmatism lines 201 and 204. These intersections enable to trace ray 41 along direction (α, β1) and ray 51 along direction (α, β2). The object visual field VF in central vision is a function of prismatic deviation and can be mathematically expressed for two rays as:

$$VF(\alpha) = |\beta 1 + Dp\_H(\alpha, \beta 1)| + |\beta 2 + Dp\_H(\alpha, \beta 2)|$$

Dp_H(α, β1) represents horizontal prismatic deviation in the gaze direction (α, β1). Horizontal prismatic deviation is the component of the prismatic deviation in a horizontal plane referenced P on FIG. 8.

Dp_H(α, β2) represents horizontal prismatic deviation in the gaze direction (α, β2).

Figure 10:
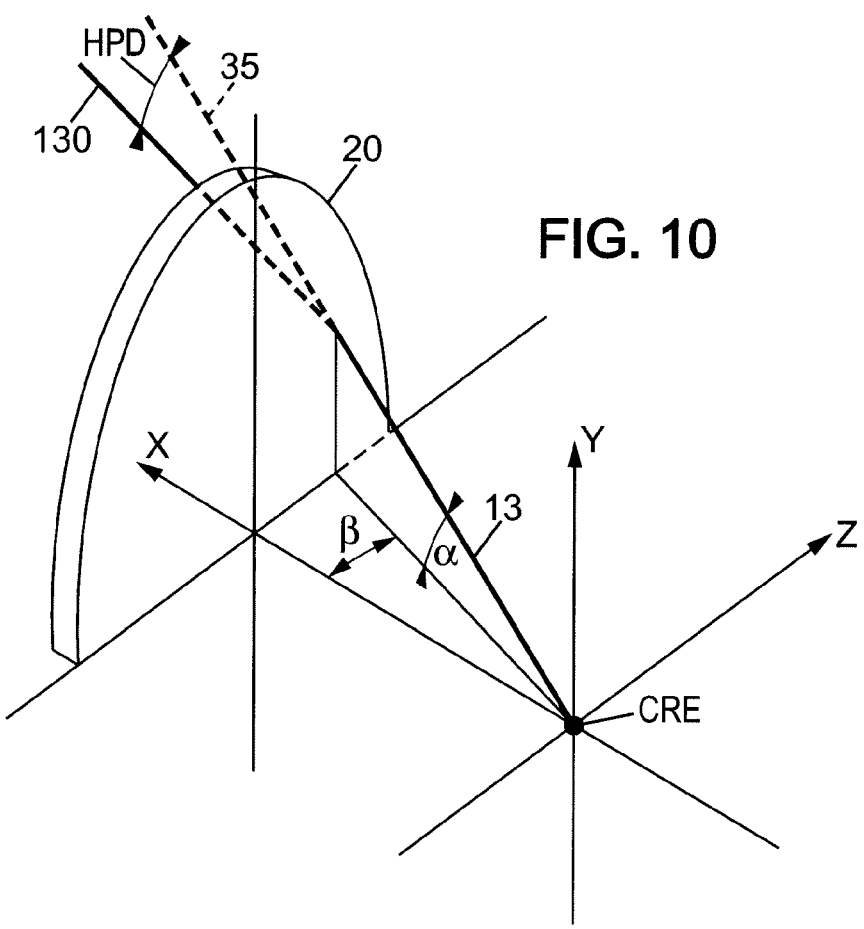
FIG. 10 illustrates horizontal prismatic deviation in central vision.

FIG. 10 illustrates horizontal prismatic deviation HPD in central vision. Prismatic deviation is defined as the angular difference between ray 130 and ray 35. Ray 130 is the image of the ray 13 in the object space. Ray 13 is issued from the eye rotation center according to direction (α, β) in the fixed reference axes (X,Y,Z) centered on the eye rotation center as represented on FIG. 10. Ray 35 is a virtual ray issued from the eye rotation center according to direction (α, β) and not deviated by the prism of the lens. Horizontal prismatic deviation HPD is the component of the prismatic deviation in the plane (XOZ) and can be calculated through:

$$HPD = \left( \text{Arcsin}\left( \left( \frac{V_{ini}^h \wedge V_{fin}^h}{\|V_{ini}^h\| \|V_{fin}^h\|} \right) \cdot \vec{y} \right) \right),$$

wherein $\vec{V^h} = \vec{V} - \vec{y}(\vec{V} \cdot \vec{y})$, and $V_{ini}$ and $V_{fin}$ are direction vectors of alternatively ray 13 and 130.

Figure 11:
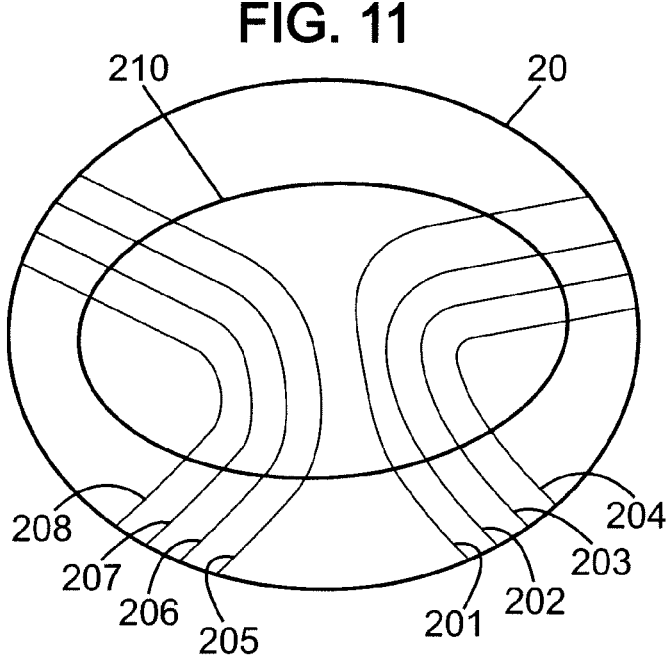
FIG. 11 illustrates total object visual field.

FIG. 11 illustrates another embodiment of object visual field in central vision defined by a set of gaze directions representing the spectacle frame shape 210. The lens 20 is represented as a surface with isoastigmatism lines 201-208. For each (αi, βi) of said gaze directions, we define Pi the plane containing:
- the vector defined by the gaze direction (αi, βi)
- the vector defined by the gaze direction (0,0)
- the Centre of Rotation of the Eye We calculate the prismatic deviation projected on Pi for the gaze direction given by (α, β)=(0,0): Dp_i(0,0).
We calculate the prismatic deviation projected on Pi for the gaze direction given by (αi, βi): Dp_i(αi, βi).
This visual field is named total object visual field and can be mathematically expressed as $$VF = \sum_i |Dp\_i(0,0) + \beta i + Dp\_i(\alpha i, \beta i)|$$

Where:
Dp_i(αi, βi) represents the prismatic deviation in the gaze direction (αi, βi) projected on the plane Pi.

Figure 12:
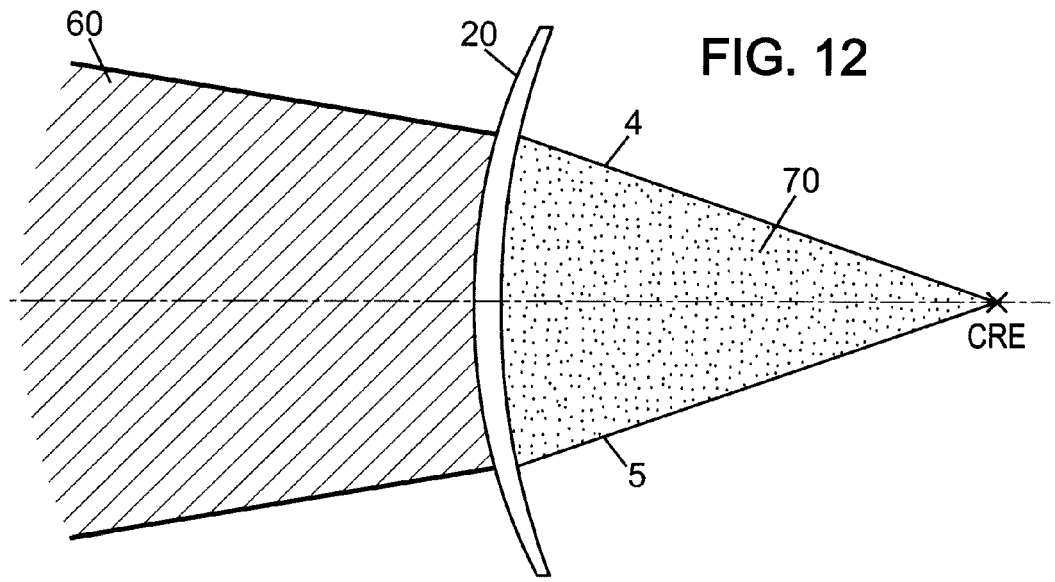
FIG. 12 illustrates image visual field in central vision.

FIG. 12 illustrates image visual field in central vision in a plane and for two arbitrarily chosen rays 4 and 5 issued from the CRE. The object visual field represents the portion of space that the eye can observe scanning an angular portion of the lens determined by ray 4 and ray 5 in the object space. The dotted part 70 represents the image visual field in central vision considering an object visual field in central vision represented in hatched part 60.

Figure 13:
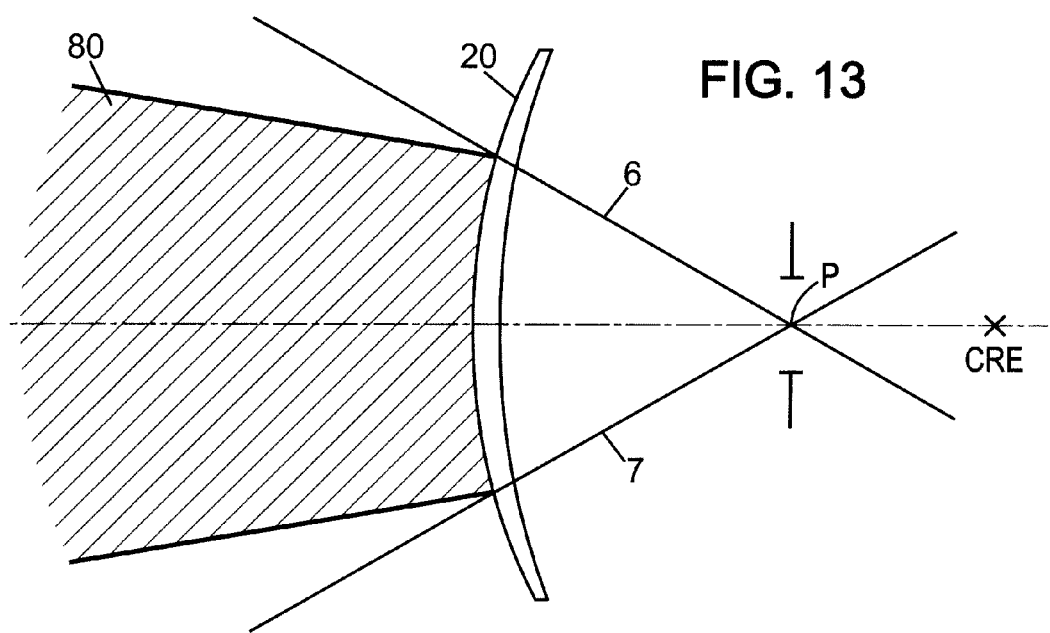
FIG. 13 illustrates object visual field in peripheral vision.

FIG. 13 illustrates object visual field in peripheral vision in a plane and for two arbitrarily chosen rays 6 and 7 issued from the entrance pupil of the eye P. The hatched part 80 represents the object visual field in peripheral vision.

Figure 14:
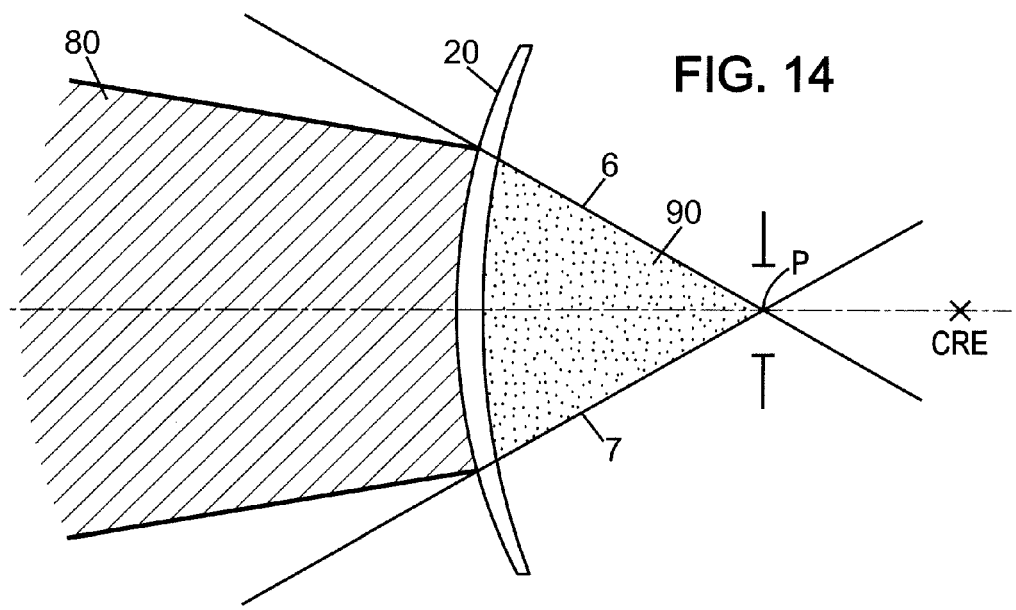
FIG. 14 illustrates image visual field in peripheral vision.

FIG. 14 illustrates image visual field in peripheral vision, rays 6 and 7 are used to define the object visual field in peripheral vision 80 and dotted part 90 represents the image visual field in peripheral vision considering an object visual field in peripheral vision represented in hatched part 80.

Figure 15:
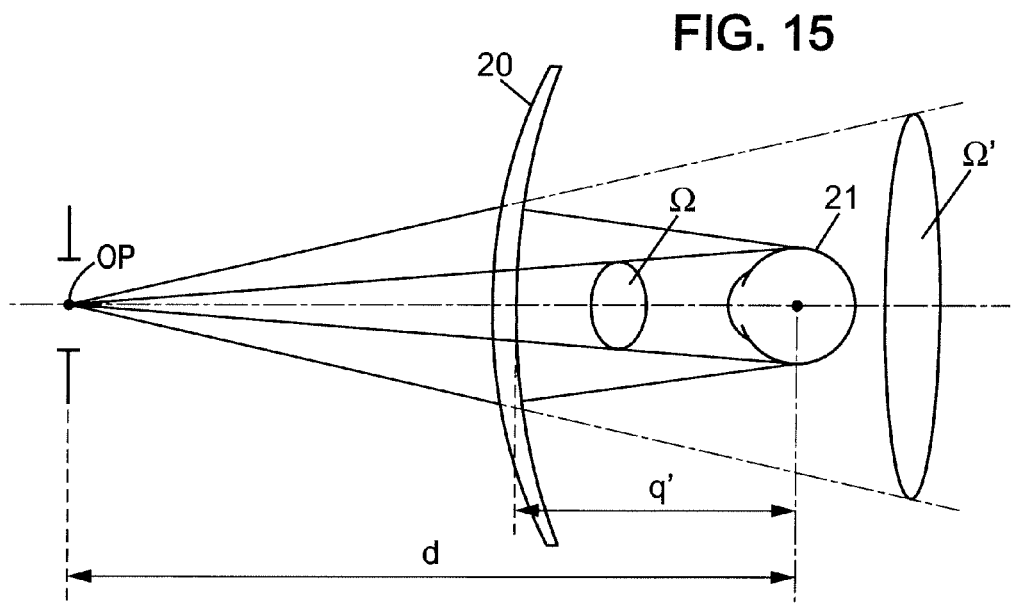
FIG. 15 illustrates the magnification of the eye.

FIG. 15 illustrates the magnification of the eye of a wearer. Ω and Ω' are alternately the solid angles under which an observer sees the eye of a wearer with and without a lens 20.

The observer is located at a distance d of the wearer which eye is referred as 21, the center of the observer entrance pupil is referred as OP and the vertex distance between the wearer's eye 21 and the lens 20 is referred as q'. For example, the distance d can be for example equal to one meter.

FIGS. 16a and b illustrate temple shift TS. Temple shift is due to the prismatic deviation induced by a lens 20 when a wearer is seen by an observer. OP is the pupil center point of an observer looking the wearer's head 25. The wearer's eye is referred as 21, the wearer's nose is referred as 27, the wearer's temple is referred as 26. The wearer is wearing spectacle lenses. Temple shift is defined as an angle TS between a ray 100 stemmed from the temple 26 when the observer is looking the temple of the wearer without the lens and a ray 101 stemmed from the temple 26 when the observer is looking the temple of the wearer through the lens 20. For example, the distance between the wearer and the observer can be equal to one meter.

Non limiting embodiments of cost functions are now described to better illustrate the invention.

We now refer to an embodiment of the invention in which the selected criteria belong to the central and peripheral criteria groups and the cost function can be defined as a sum, over a set of selected criteria $(C_1, \ldots C_{N1})$, of each selected criterion cost function.

For a selected criterion $C_k$ ($k \in [1 \ldots N_1]$, $N_1$ integer superior or equal to 1), in order to define a criterion cost function, we further develop the expression of the criterion values.

An evaluation zone $D_k$ is associated to a criterion $C_k$. The evaluation zone comprises one or several evaluation domain $D^i_k$, ($i \in [1 \ldots M_k]$, $M_k$ integer superior or equal to 1 represents the number of evaluation domains associated to a criterion) said evaluation domain being defined as at least one gaze direction $(\alpha, \beta)$ if said criterion belongs to the central vision criteria group, or at least one peripheral ray direction $(\alpha', \beta')$ if said criterion belongs to the peripheral vision criteria group.

For a criterion $C_k$ and an evaluation zone $D_k$, an evaluation function $H_k$ associates to one evaluation domain $D^i_k$ of $D_k$ a criterion value $H_k(D^i_k, v)$ for a lens defined by its parameters v.

Target values are also associated to the evaluation domains. Target values are determined by the optical designer by several ways:
By using a database where target values are predetermined for a criterion and a corresponding set of evaluation domains.
By using an analytic function.

Given criterion values and corresponding set of targets, the criterion cost function can be mathematically defined by:

$$J_k(v) = \sum_{i=1}^{Mk} w_k^i * (H_k(D_k^i, v) - T_k^i)^2,$$

wherein $T^i_k$ is a target value associated to an evaluation domain $D^i_k$ and $w^i_k$ are predetermined weights.

One can note that criteria related to visual field are computed from at least two directions (peripheral or gaze). For those criteria an evaluation domain $D^i_k$ is composed of several directions (peripheral ray directions for a visual field in peripheral vision or gaze directions for a visual field in central vision).

Then, the cost function can be mathematically expressed by:

$$J(v) = \sum_{k=1}^{M} J_k(v)$$

In one embodiment previous selected criteria $(C_1, \ldots C_{N1})$ further comprise $(C'_1, \ldots C'_{N2})$ criteria belonging to the global optical criteria group.

For a criterion $C'_k$ ($k \in [1 \ldots N_2]$, $N_2$ integer superior or equal to 1) belonging to $(C'_1, \ldots C'_{N2})$, $H'_k$ associates a single criterion value to an optical system of parameters v. The mathematical expression of a criterion cost function for a criterion belonging to the global optical criteria group is then:

$$J'_k(v) = w'_k * (H'_k(v) - T'_k)^2,$$

wherein $T'_k$ is the target value associated to $C'_k$ and $w'_k$ is a predetermined weight.

The cost function relating to all the selected criteria can then be expressed by:

$$J(v) = \sum_{k=1}^{M} J_k(v) + \sum_{k=1}^{N2} J'_k(v)$$

The invention shall be further illustrated by the use of the following examples.

EXAMPLE 1

Example 1 corresponds to the application of the method of the invention in the case of a progressive ophthalmic lens.

FIGS. 17a, 17b and 17c illustrate respectively the sphere profile along the meridian line, the sphere contour plot and the cylinder contour plot of the optical reference surface having a base of 3 D and an addition of 2.5 D, used in example 1.

The prescription of the wearer is a power of −4D in far vision and an addition of 2.5 D.

The selected criteria of the optical function are the astigmatism in central vision and the power in central vision.

For the astigmatism in central vision the target value is set to 0 D along the meridian line between the far vision point and the near vision point.

For the power in central vision, the target value is set to −4D in the gaze direction corresponding to 20° above the fitting cross point and a difference of power between the far vision point and the near vision point of 2.88 D.

The parameters of the virtual wearer-ophthalmic lens-ergorama system that may be modified are the addition of the surface of the virtual progressive ophthalmic lens, the prism of the virtual progressive ophthalmic lens, the pantoscopic angle and the repartition of distance as a function of the gaze direction.

The other parameters of the virtual wearer-ophthalmic lens-ergorama system are set to standard values, that is a distance between the center of rotation of the eye and the virtual lens of 25.5 mm, a base curve of the virtual ophthalmic lens set to 3.6 D, a tightness constraint at the side of the virtual lens of 0.3 mm and at the center of the virtual lens of 1.9 mm.

The virtual wearer-ophthalmic lens-ergorama system determined by the method of the invention has an addition of the surface of the virtual progressive ophthalmic lens of 2.75 D, a prism of the virtual progressive ophthalmic lens of 0 prismatic dioptre, a pantoscopic angle of 7.8° and infinite object distances for all the gaze directions.

FIGS. 18a, 18b and 18c represent respectively the power profile along the meridian line, the power contour plot and the astigmatism contour plot of the progressive addition lens obtained using a prior art method.

FIGS. 19a, 19b and 19c represent respectively the power profile along the meridian line, the power contour plot and the astigmatism contour plot of the progressive addition lens obtained using the method of the invention.

By comparing FIGS. 18 and 19, it appears that the astigmatism along the meridian between the far and near vision points has been reduced by using the method according to the invention. For example, at the near vision point the astigmatism has been reduced from 0.39 D for the ophthalmic lens obtained using a prior art method to 0.08D for the ophthalmic lens obtained using a method according to the invention.

EXAMPLE 2

Example 2 corresponds to the application of the method of the invention in the case of a progressive ophthalmic lens.

FIGS. 20a, 20b and 20c illustrate respectively the sphere profile along the meridian line, the sphere contour plot and the cylinder contour plot of the optical reference surface having a base of 8 D and an addition of 2 D, used in example 2.

The prescription of the wearer is a power of 6 D in far vision and an addition of 2 D.

The selected criteria of the optical function are the astigmatism in central vision and the power in central vision.

For the astigmatism in central vision the target value is set to 0 D at the fitting cross, the far vision point and the near vision point.

For the power in central vision, the target value is set to 5.9D in the gaze direction corresponding to 20° above the fitting cross and a difference in power between the far vision point and the near vision point of 1.93 D.

The parameters of the virtual wearer-ophthalmic lens-ergorama system that may be modified are the prism of the virtual progressive ophthalmic lens and the pantoscopic angle.

The other parameters of the virtual wearer-ophthalmic lens-ergorama system are set to standard values, that is a surface addition of 2 D, a distance between the center of rotation of the eye and the virtual lens of 25.5 mm, a base curve of the virtual ophthalmic lens set to 1.53 D, the tightness constraint at the side of the virtual lens of 0.3 mm and at the center of the virtual lens of 1.9 mm, and a wrap angle of 0°.

The virtual wearer-ophthalmic lens-ergorama system determined by the method of the invention has an addition of the surfaces of the virtual progressive ophthalmic lens of 2 D, a prism of the virtual progressive ophthalmic lens of 0 prismatic dioptre, a pantoscopic angle of 7.8°.

FIGS. 21a, 21b and 21c represent respectively the power profile along the meridian line, the power contour plot and the astigmatism contour plot of the progressive addition lens obtained using a prior art method.

FIGS. 22a, 22b and 22c represent respectively the power profile along the meridian line, the power contour plot and the astigmatism contour plot of the progressive addition lens obtained using the method of the invention.

By comparing FIGS. 21 and 22, it appears that the astigmatism at the near vision point has been reduced from 0.08 D for the ophthalmic lens obtained using a prior art method to 0.02 D for the ophthalmic lens obtained using a method according to the invention. Furthermore, the astigmatism at the fitting cross has been reduced from 0.10 D for the ophthalmic lens obtained using a prior art method to 0.05 D for the ophthalmic lens obtained using a method according to the invention.

EXAMPLE 3

Example 3 corresponds to the application of the method of the invention in the case of a progressive ophthalmic lens.

FIGS. 23a and 23b illustrate respectively the sphere contour plot and the cylinder contour plot of the optical reference surface having a base of 5.5 D and an addition of 2.5 D, used in example 3.

The prescription of the wearer is a power of 2.5 D at the far vision point and an addition of 2.5 D.

The selected criteria of the optical function are the astigmatism in central vision and the power in central vision.

For the astigmatism in central vision the target value is set so as to have an angle of 29.5° between the isoastigmatism lines corresponding to 1 D of astigmatism at the eye declination corresponding to an angle of 40°.

For the power in central vision, the target value is set so as to have an angle of 17.5° between the isopower lines corresponding to the power at the near vision point that is 5 D, at the eye declination corresponding to an angle of 40°.

The parameters of the virtual wearer-ophthalmic lens-ergorama system that may be modified are the addition, the prism of the virtual progressive ophthalmic lens, the pantoscopic angle and the repartition of object distances as a function of the gaze direction.

The other parameters of the virtual wearer-ophthalmic lens-ergorama system are set to standard values, that is a distance between the center of rotation of the eye and the virtual lens of 25.5 mm, a base curve of the virutal lens set to 6.25 D, the tightness constraint at the side of the virtual lens of 0.3 mm and at the center of the virtual lens of 1.9 mm, a wrap angle of 0°.

The virtual wearer-ophthalmic lens-ergorama system determined by the method of the invention has an addition of the surfaces of the virtual progressive ophthalmic lens of 2.55 D, a prism of the virtual progressive ophthalmic lens of 0 prismatic dioptre, a pantoscopic angle of 10° and infinite object distances for all the gaze directions.

FIGS. 24a and 24b represent respectively the power contour plot and the astigmatism contour plot of the progressive addition lens obtained using a prior art method.

FIGS. 25a and 25b represent respectively the power contour plot and the astigmatism contour plot of the progressive addition lens obtained using the method of the invention.

By comparing FIGS. 24a and 25a, it appears that the width of the isopower line 20 corresponding to 5 D at the gaze direction corresponding to an angle of 40° has been shifted from 11° for the ophthalmic lens obtained using a prior art method to 17.5° for the ophthalmic lens obtained using a method according to the invention.

Furthermore, by comparing FIGS. 24b and 25b, it appears that the width between the isoastigmatism lines 22 corresponding to 1 D of astigmatism at the gaze direction corresponding to an angle of 40° has been unchanged from 29.5° for the ophthalmic lens obtained using a prior art method to 29.5° for the ophthalmic lens obtained using a method according to the invention.

EXAMPLE 4

Example 4 corresponds to the application of the method of the invention in the case of a progressive ophthalmic lens.

FIGS. 26a and 26b illustrate respectively the sphere contour plot and the cylinder contour plot of the optical reference surface having a base of 4 D and an addition of 2.5 D, used in example 4.

The prescription of the wearer is a power of 0 D at the far vision point and an addition of 2.5 D.

The selected criteria of the optical function are the higher-order aberrations. The target value for the higher-order aberrations is set so as to have the maximum value of the root mean square RMS of the higher-order aberration reduced of 1.5 times.

The parameter of the virtual wearer-ophthalmic lens-ergorama system that may be modified is the diameter of the pupil of the wearer.

The other parameters of the wearer-ophthalmic lens-ergorama system are set to standard values, that is a distance between the center of rotation of the eye and the virtual lens of 25.5 mm, a base curve of the virtual ophthalmic lens set to 6.25 D, the tightness constraint at the side of the virtual lens of 0.3 mm and at the center of the virtual lens of 1.9 mm, a wrap angle of 0°.

The virtual wearer-ophthalmic lens-ergorama system determined by the method of the invention has a pupil diameter set to 6 mm.

FIG. 27 illustrates the iso-higher-order aberrations RMS values of an ophthalmic lens obtained without using the method of the invention.

FIG. 28 illustrates the iso-higher-order aberration RMS values of an ophthalmic lens obtained after using an optimization method based on the virtual wearer-ophthalmic lens-ergorama system determined by the method of the invention.

By comparing FIGS. 27 and 28, it appears that the maximum value of the RMS of iso-higher-order aberration 30 has been reduced from 2.4 μm for the ophthalmic lens obtained using a prior art method to 1.3 μm for the ophthalmic lens obtained using a method according to the invention.

The invention has been described above with the aid of embodiments without limitation of the general inventive concept. In particular the present invention provides a method for calculating by optimization an virtual optical system, the optical system being all kinds of optical lenses, particularly ophthalmic lenses, e.g. single vision (spherical, torical), bifocal, progressive, aspherical lenses (etc).

The invention claimed is:

1. A method, implemented by one or more processors, for determining a virtual wearer-ophthalmic lens-ergorama system associated with an optical function of an ophthalmic lens for a given wearer, comprising:
  a prescription data providing step S1, in which prescription data (PD) representing the prescription of the wearer are provided,
  an optical reference surface data providing step S2, in which surface data (SD) representing a optical reference surface corresponding to the prescription of the wearer are provided,
  a virtual wearer-ophthalmic lens-ergorama system determining step S3, in which a virtual wearer-ophthalmic lens-ergorama system (WLES) is determined using the prescription and surface data,
  a criteria selecting step S4, in which at least one optical criterion of the optical function associated with the virtual wearer-ophthalmic lens-ergorama system (WLES) is selected,
  a target value defining step S5, in which for the at least one selected criterion a target value associated to said criteria is defined,
  an evaluation step S6, in which the evaluated value of the at least one selected optical criterion of the optical function associated with the virtual wearer-ophthalmic lens-ergorama system (WLES) is evaluated,
  a modification step S7, in which at least one parameter of the virtual wearer-ophthalmic lens-ergorama system different from the base curve of the ophthalmic lens is modified, in order to minimize the difference between the target value and the evaluation criterion value,
  wherein during the modification step S7, the surface data (SD) representing the optical reference surface corresponding to the prescription of the wearer are unchanged, wherein the at least one optical criterion is selected among one or several of the three following criteria groups consisting of:
    central vision criteria (CVOC) group consisting of: power in central vision, astigmatism in central vision, higher-order aberration in central vision, acuity in central vision, contrast in central vision, prismatic deviation in central vision, ocular deviation, object visual field in central vision, image visual field in central vision, magnification in central vision and a variation of preceding criteria;
    peripheral vision criteria (PVOC) group consisting of: power in peripheral vision, astigmatism in peripheral vision, higher-order aberration in peripheral vision, pupil field ray deviation, object visual field in peripheral vision, image visual field in peripheral vision, prismatic deviation in peripheral vision, magnification in peripheral vision, and a variation of preceding criteria;
    global optical criteria (GOC) group consisting of: magnification of the eyes and temple shift;
  and wherein during the target value defining step for each selected criterion is defined:
    an evaluation zone comprising one or several evaluation domains and a set of target values associated to said evaluation domains, if said criterion belongs to the central or to the peripheral vision criteria groups, or
    a target value associated to said criterion, if said criterion belongs to the global optical criteria group;
  and during the evaluation step, if the selected criterion belongs to the central or peripheral vision criteria groups, a set of criterion values associated to said evaluation domains is evaluated.

2. The method according to claim 1, wherein during the modification step the at least one parameter of the virtual wearer-ophthalmic lens-ergorama system is modified in order to minimize a cost function considering the target value by repeating the evaluation step until a stop criterion is satisfied.

3. The method according to claim 2, wherein the cost function is a sum over the selected criteria of:
  sums, over the evaluation domains, of differences between a criterion value associated to an evaluation domain and the target value associated to said evaluation domain to the power of two, for criteria belonging to the central vision and peripheral vision criteria groups, and
  differences between a criterion value and a target value to the power of two, for criteria belonging to the global optical criteria group.

4. The method according to claim 3, wherein the cost function J is mathematically expressed according to:

$$J(v) = \sum_{k=1}^{N1} \sum_{i=1}^{Mk} w_k^i * (H_k(D_k^i, v) - T_k^i)^2 + \sum_{k=1}^{N2} w_k' * (H_k'(v) - T_k')^2,$$

wherein:

k and i are integer variables, $N_1$ is an integer superior or equal to 1 and represents the number of selected criteria belonging to the central vision and peripheral vision criteria groups;

$N_2$ is an integer superior or equal to 1 and represents the number of selected criteria belonging to the global optical criteria group;

$M_k$ is an integer superior or equal to 1 and represents the number of evaluation domains for a criterion belonging to the central vision or peripheral vision criteria groups of index k;

v is defining the virtual wearer-ophthalmic lens-ergorama system parameters;

$w^i_k$ are the weights associated to a criterion belonging to the central vision or peripheral vision criteria groups of index k and to an evaluation domain of index i;

$w'_k$ is the weight associated to a criterion belonging to the global optical criteria group of index k $D^i_k$ is an evaluation domain of index i of an evaluation zone associated to a criterion belonging to the central vision or peripheral vision criteria groups of index k;

$H_k$ associates a criterion value to a criterion belonging to the central vision or peripheral vision criteria groups of index k an evaluation domain $D^i_k$ and the virtual wearer-ophthalmic lens-ergorama system defined by its parameters v;

$H'_k$ associates a criterion value to a criterion belonging to the global optical criteria group of index k and the virtual wearer-ophthalmic lens-ergorama system defined by its parameters v;

$T^i_k$ is a target value of index i of the set of target values associated to an evaluation domain $D^i_k$, of a criterion belonging to the central vision or peripheral vision criteria groups of index k;

$T'_k$ is the target value associated to a criterion belonging to the global optical criteria group of index k.

5. The method according to claim 1, wherein the at least one parameter of the virtual wearer-ophthalmic lens-ergorama system is selected among one or several of the four following parameters groups consisting of:

eyes parameter group consisting of: the diameter of the pupil, the position of the pupil, the position of the center of rotation of the eye, the position of the different diopter of the eye, for example the retina, the curvature of the different diopter of the eye, for example the retina, the index of the different environment of the eye;

ophthalmic lens parameter group consisting of : the tightness at a given point of the ophthalmic lens, the prism of the ophthalmic lens, index of the substrate;

wearing parameter group consisting of : the vertex distance, pantoscopic angle, the wrap angle; and object space parameter group consisting of the reparation of distance as a function of the gaze direction of each eye.

6. The method according to claim 5, wherein the ophthalmic lens is a progressive ophthalmic lens and wherein the ophthalmic lens parameter group further comprises the addition of the different surfaces of the progressive ophthalmic lens.

7. The method according to claim 1, wherein the ophthalmic lens is a progressive ophthalmic lens.

8. The method according to claim 1, wherein a selected criterion belongs to the central vision criteria group and wherein the associated evaluation domains comprise at least one gaze direction, said direction being considered with regard to reference axes associated with the eye rotation center and used to perform ray tracing from the eye rotation center for the criterion evaluation.

9. The method according to claim 1, wherein a selected criterion belongs to the peripheral vision criteria group and the associated evaluation domains comprise at least one peripheral ray direction, said direction being considered with regard to reference axes associated with the entrance pupil center moving along a determined gaze direction and used to perform ray tracing from the entrance pupil center for the criterion evaluation.

10. A non-transitory computer-readable medium carrying one or more sequences of instructions that, when executed by one or more processors, cause the one or more processors to carry out the steps of claim 1.

11. The method according to claim 1, wherein during the modification step the at least one parameter of the virtual wearer-ophthalmic lens-ergorama system is modified in order to minimize a cost function considering the target value by repeating the evaluation step until a stop criterion is satisfied.

12. A method of calculating an ophthalmic lens, the ophthalmic lens being identified by a optical function, at least two optical surfaces comprise a first optical surface defined by a first equation and a second surface defined by a second equation, the method further comprises:

an optical function determining step, in which the optical function is determined from a virtual wearer-ophthalmic lens-ergorama system determined according to any of the preceding claims, a calculation step, in which the second equation is calculated from the optical function, and the first equation.

13. A method of manufacturing an ophthalmic lens, the ophthalmic lens being associated with an optical function, the ophthalmic lens comprising a first surface defined by a first equation and a second surface defined by a second equation, the method comprising:

the calculation step according to claim 12, in which the second equation is calculated from the optical function, and the first equation;

a semi-finished ophthalmic lens providing step, in which a semi-finished ophthalmic lens comprising the first surface is provided; and a machining step, in which the semi-finished ophthalmic lens is machined so as to be further provided with a second surface defined by the second equation and to obtain the ophthalmic lens.

14. A computer-readable medium carrying one or more sequences of instructions that, when executed by a processor, cause the processor to carry out the steps of claim 12.

* * * * *